US011299312B2

(12) United States Patent
Vanswijgenhoven et al.

(10) Patent No.: US 11,299,312 B2
(45) Date of Patent: Apr. 12, 2022

(54) METHOD FOR PRODUCING A LEAK-TIGHT VESSEL, AND A LEAK-TIGHT VESSEL

(71) Applicant: Covess N.V., Heusden-Zolder (BE)

(72) Inventors: Tony Vanswijgenhoven, Hasselt (BE); Dieter Vanswijgenhoven, Hasselt (BE); Axel Seifert, Zonhoven (BE)

(73) Assignee: Covess N.V., Heusden-Zolder (BE)

( * ) Notice: Subject to any disclaimer, the term of this patent is extended or adjusted under 35 U.S.C. 154(b) by 377 days.

(21) Appl. No.: 16/408,570

(22) Filed: May 10, 2019

(65) Prior Publication Data

US 2019/0375535 A1    Dec. 12, 2019

Related U.S. Application Data

(62) Division of application No. 13/698,287, filed as application No. PCT/BE2011/000029 on May 13, 2011, now Pat. No. 10,287,052.

(30) Foreign Application Priority Data

May 17, 2010  (WO) ................ PCT/EP2010/056695
May 17, 2010  (WO) ................ PCT/EP2010/056696
May 17, 2010  (WO) ................ PCT/EP2010/056699

(51) Int. Cl.
*B65D 3/00*     (2006.01)
*B29C 53/60*    (2006.01)
(Continued)

(52) U.S. Cl.
CPC .............. *B65D 3/00* (2013.01); *B29C 53/581* (2013.01); *B29C 53/602* (2013.01);
(Continued)

(58) Field of Classification Search
CPC ... B29C 53/591; B29C 53/602; B29C 53/824; B29C 70/086; B29C 70/86; F17C 1/02; B65D 3/00
(Continued)

(56) References Cited

U.S. PATENT DOCUMENTS 3,220,910 A   11/1965 Walkey
3,334,780 A   8/1967  Leer et al.
(Continued)

FOREIGN PATENT DOCUMENTS

EP    2 571 671    7/2015
FR    1 520 457    4/1968
(Continued)

OTHER PUBLICATIONS

International Search Report and Written Opinion of the International Searching Authority, dated Dec. 7, 2011, from counterpart International Application No. PCT/BE2011/000029, filed on May 13, 2011.
(Continued)

*Primary Examiner* — J. Gregory Pickett
*Assistant Examiner* — Niki M Eloshway
(74) *Attorney, Agent, or Firm* — HoustonHogle LLP

(57) ABSTRACT

The present invention describes a method for producing a leak-tight vessel for holding a gas and/or liquid, comprising the steps of winding a heat-sealable thermoplastic barrier strip around a removable mandrel in such a way that each strip fragment overlaps with a substantially parallel strip fragment over at least a lateral overlapping distance, consolidating the overlapping strip fragments so as to form a gas and/or liquid tight layer, winding a fibrous material around the gas and/or liquid tight layer, thereby leaving an opening large enough for removing the mandrel. The invention also describes a leak-tight vessel produced in this way.

15 Claims, 17 Drawing Sheets

(51) Int. Cl.
*F17C 1/02* (2006.01)
*B29C 53/58* (2006.01)
*B29C 70/08* (2006.01)
*B29C 53/82* (2006.01)
*B29C 70/86* (2006.01)
*B29K 101/12* (2006.01)
*B29K 105/24* (2006.01)
*B29L 31/00* (2006.01)

(52) U.S. Cl.
CPC .......... *B29C 53/824* (2013.01); *B29C 70/086* (2013.01); *B29C 70/86* (2013.01); *F17C 1/02* (2013.01); *B29K 2101/12* (2013.01); *B29K 2105/243* (2013.01); *B29L 2031/712* (2013.01); *B29L 2031/7156* (2013.01); *F17C 2201/0109* (2013.01); *F17C 2201/056* (2013.01); *F17C 2201/058* (2013.01); *F17C 2203/067* (2013.01); *F17C 2203/0609* (2013.01); *F17C 2209/2163* (2013.01); *F17C 2209/234* (2013.01); *F17C 2223/0123* (2013.01); *F17C 2223/036* (2013.01); *Y02E 60/32* (2013.01)

(58) Field of Classification Search
USPC ..................................... 220/60, 581, 589, 600
See application file for complete search history.

(56) References Cited

U.S. PATENT DOCUMENTS

| | | | | |
|---|---|---|---|---|
| 3,367,815 | A * | 2/1968 | Ragettli | B29C 53/824 |
| | | | | 156/175 |
| 3,463,059 | A | 8/1969 | Vonk | |
| 3,508,677 | A * | 4/1970 | Laibson | B29C 66/7392 |
| | | | | 220/590 |
| 4,448,628 | A | 5/1984 | Stott | |
| 4,760,949 | A | 8/1988 | Elias | |
| 5,266,137 | A | 11/1993 | Hollingsworth | |
| 5,487,806 | A | 1/1996 | Viellard | |
| 5,798,156 | A | 8/1998 | Mitlitsky et al. | |
| 6,102,241 | A | 8/2000 | Palazzo | |
| 6,158,605 | A * | 12/2000 | DeLay | B29C 53/602 |
| | | | | 220/62.17 |
| 6,361,635 | B1 | 3/2002 | Ayorinde | |
| 7,802,799 | B1 * | 9/2010 | Semmes | B29C 65/56 |
| | | | | 277/627 |
| 2004/0026431 | A1 * | 2/2004 | Jones | F17C 1/06 |
| | | | | 220/588 |
| 2004/0108319 | A1 | 6/2004 | Bettinger | |
| 2009/0314785 | A1 | 12/2009 | Cronin et al. | |
| 2012/0037641 | A1 * | 2/2012 | Bruce | F17C 13/002 |
| | | | | 220/589 |
| 2012/0234840 | A1 | 9/2012 | Strassburger et al. | |
| 2017/0038006 | A1 * | 2/2017 | Emori | F17C 1/02 |
| 2019/0257473 | A1 * | 8/2019 | Kanezaki | F17C 1/02 |
| 2019/0309903 | A1 * | 10/2019 | Otsubo | F17C 1/02 |

FOREIGN PATENT DOCUMENTS

| | | |
|---|---|---|
| FR | 2 173 837 | 10/1973 |
| GB | 1 255 738 | 12/1971 |

OTHER PUBLICATIONS

International Preliminary Report on Patentability, dated Nov. 20, 2012, from counterpart International Application No. PCT/BE2011/000029, filed on May 13, 2011.

International Search Report and Written Opinion of the International Searching Authority, dated Mar. 7, 2011, from counterpart International Application No. PCT/EP2010/056695, filed on May 17, 2010.

International Preliminary Report on Patentability, dated Nov. 20, 2012, from counterpart International Application No. PCT/EP2010/056695, filed on May 17, 2010.

International Search Report and Written Opinion of the International Searching Authority, dated Mar. 2, 2011, from counterpart International Application No. PCT/EP2010/056696, filed on May 17, 2010.

International Preliminary Report on Patentability, dated Nov. 29, 2012, from counterpart International Application No. PCT/EP2010/056696, filed on May 17, 2010.

International Search Report and Written Opinion of the International Searching Authority, dated Feb. 7, 2011, from counterpart International Application No. PCT/EP2010/056699, filed on May 17, 2010.

International Preliminary Report on Patentability, dated Nov. 29, 2012, from counterpart International Application No. PCT/EP2010/056699, filed on May 17, 2010.

* cited by examiner

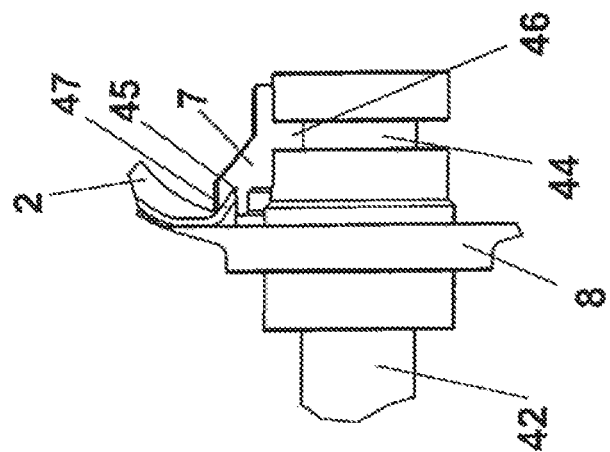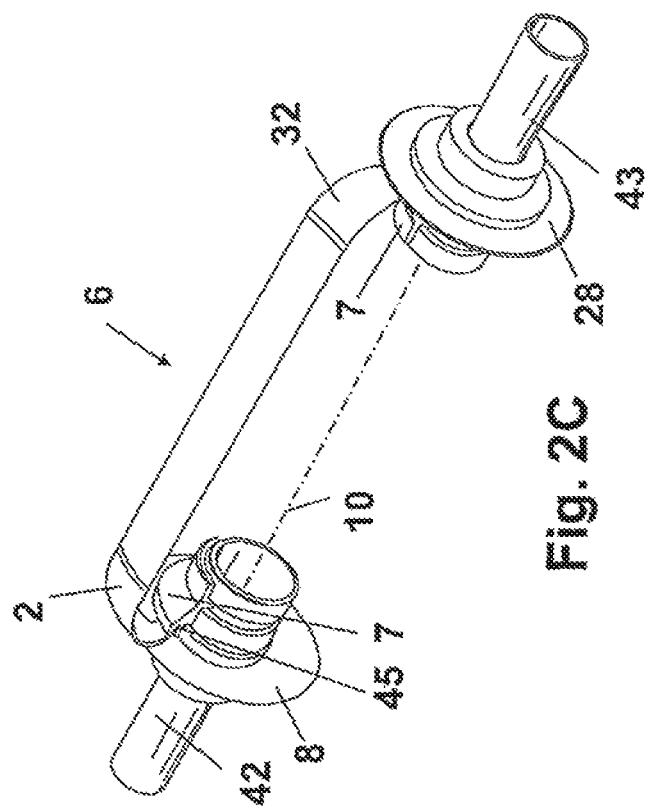

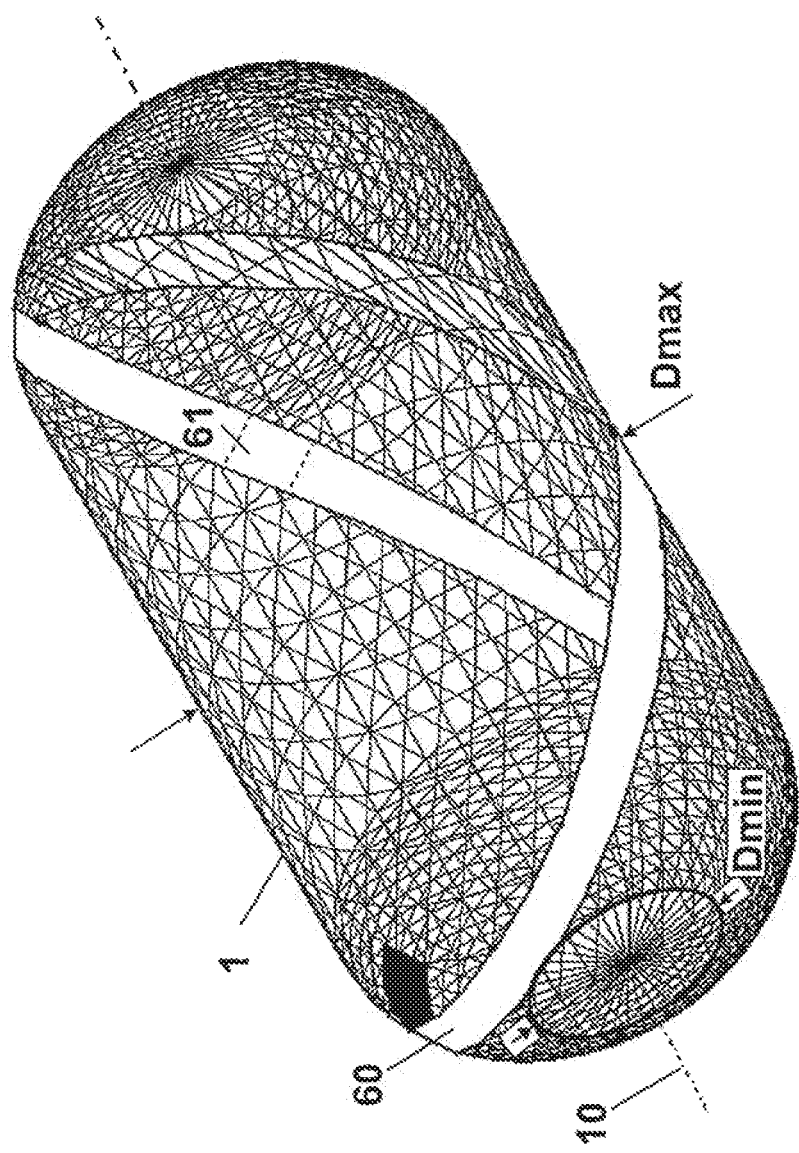

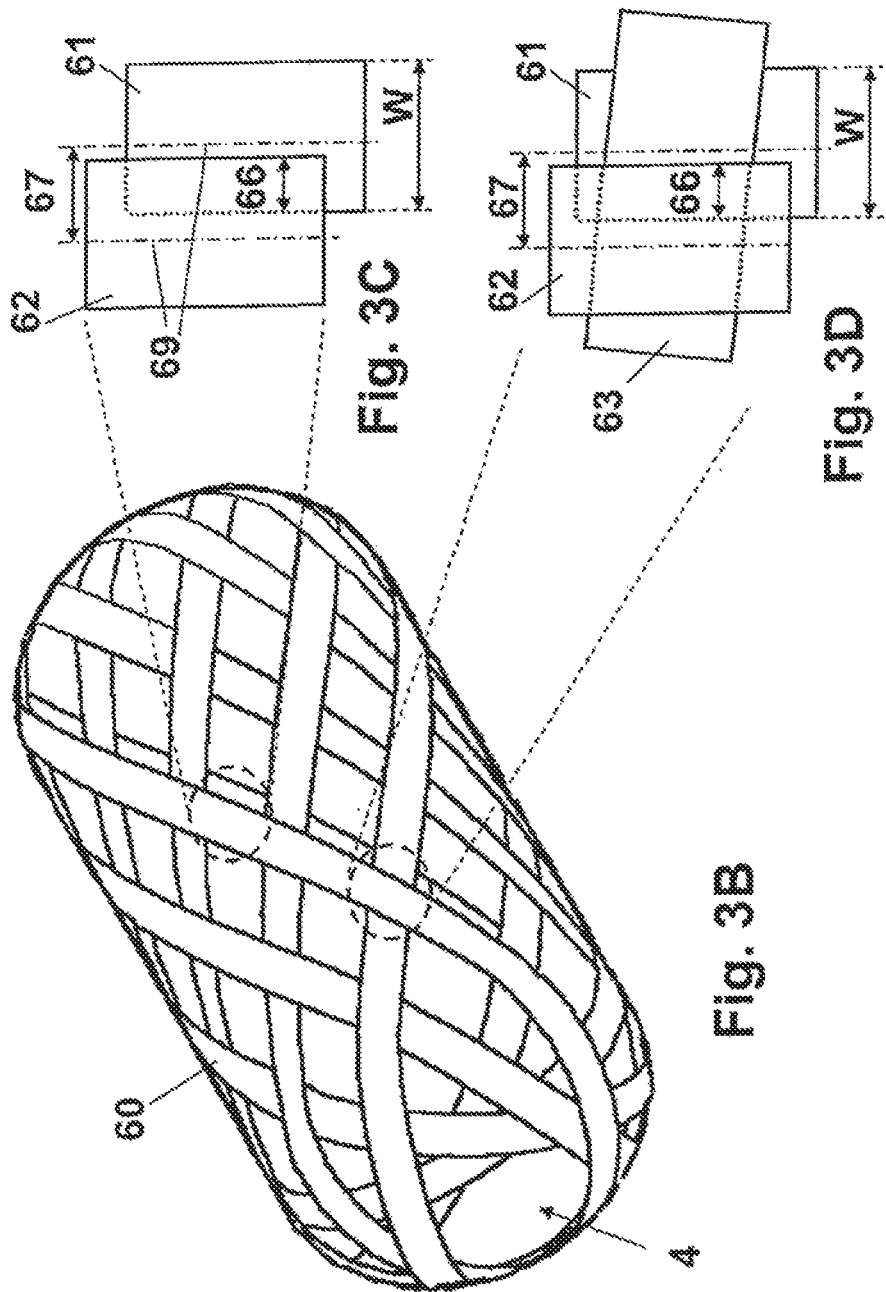

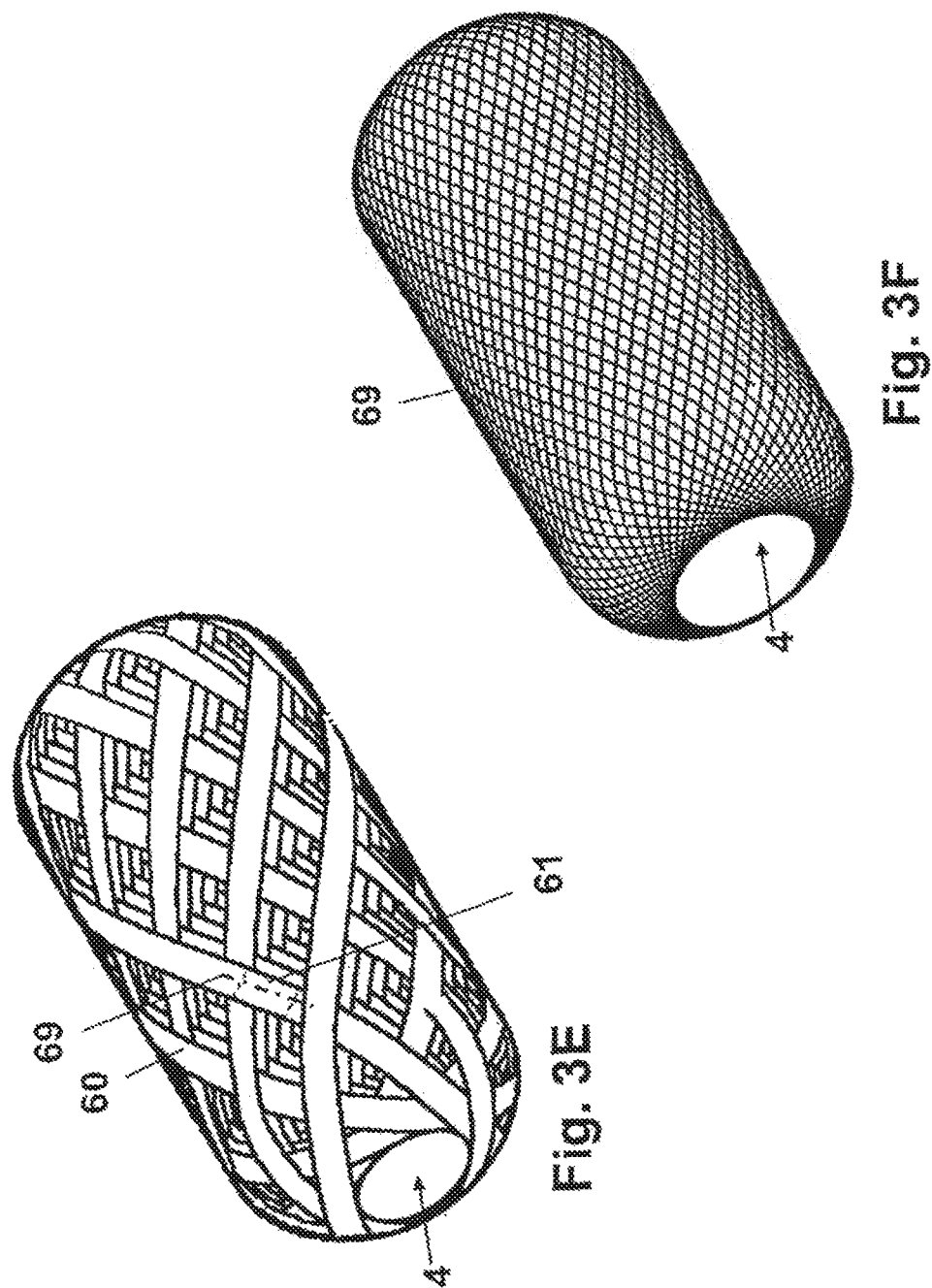

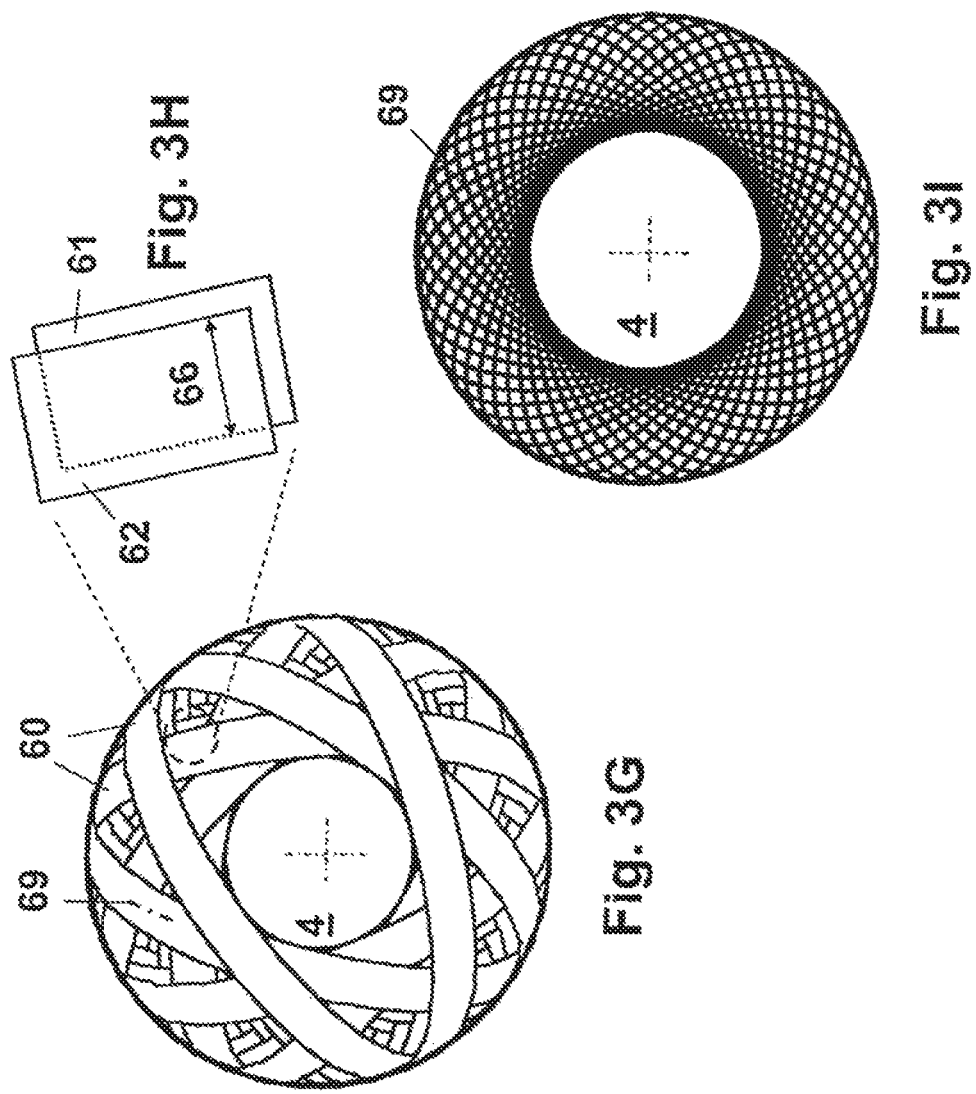

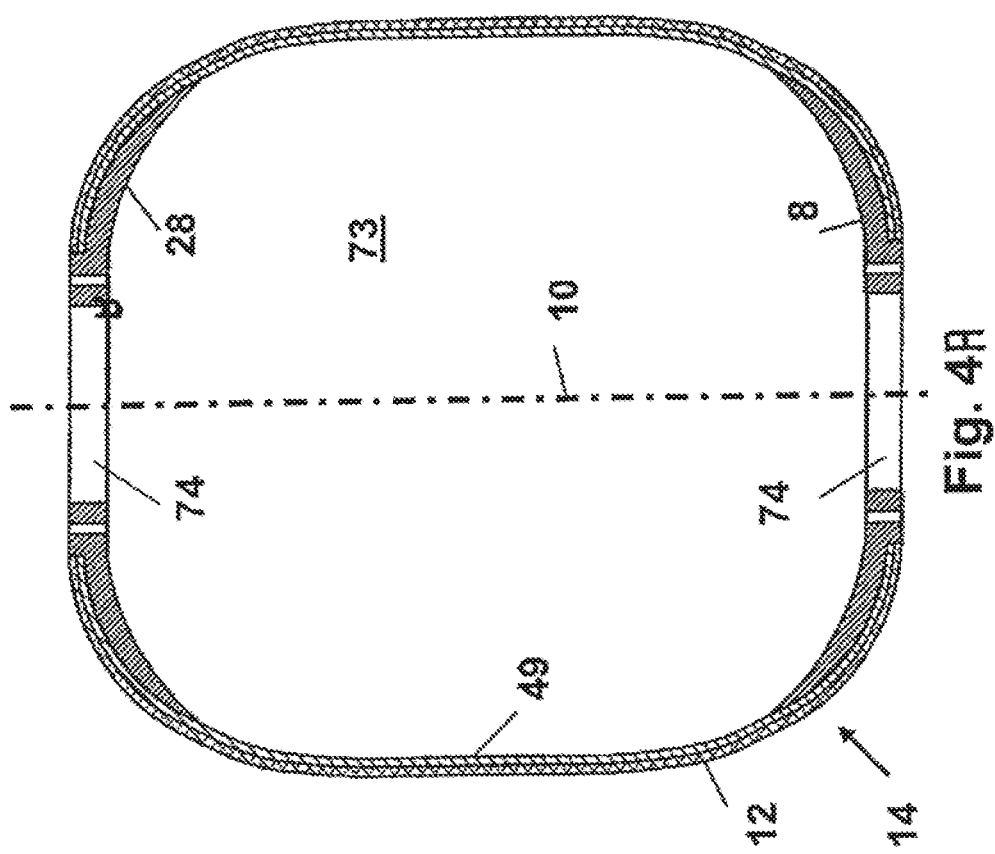

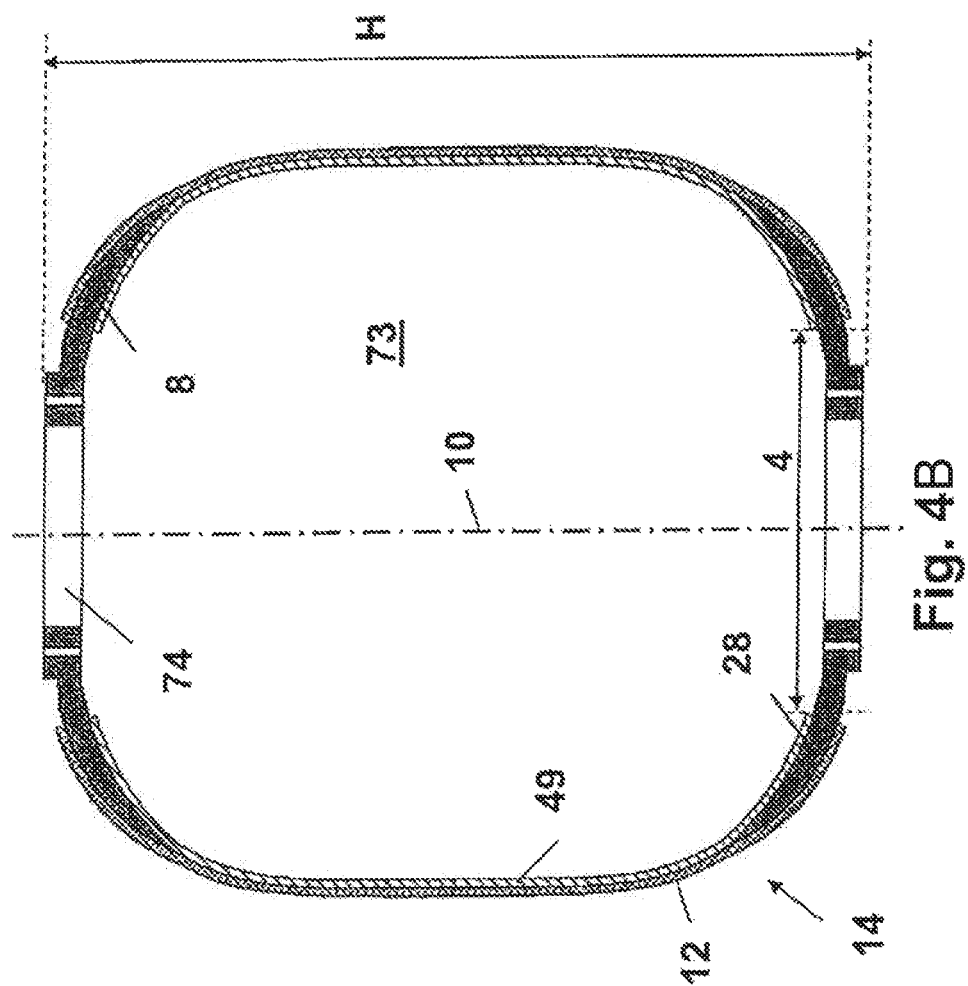

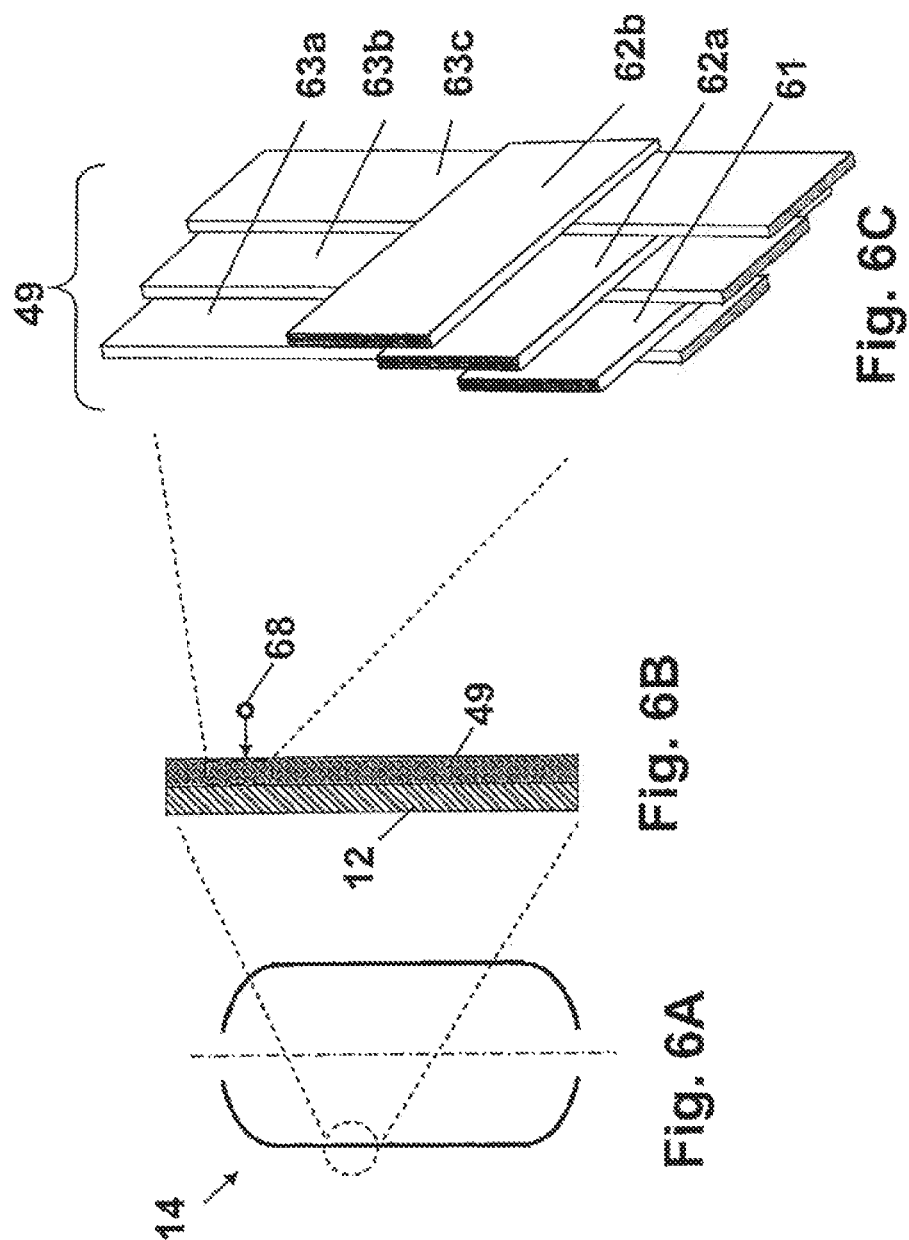

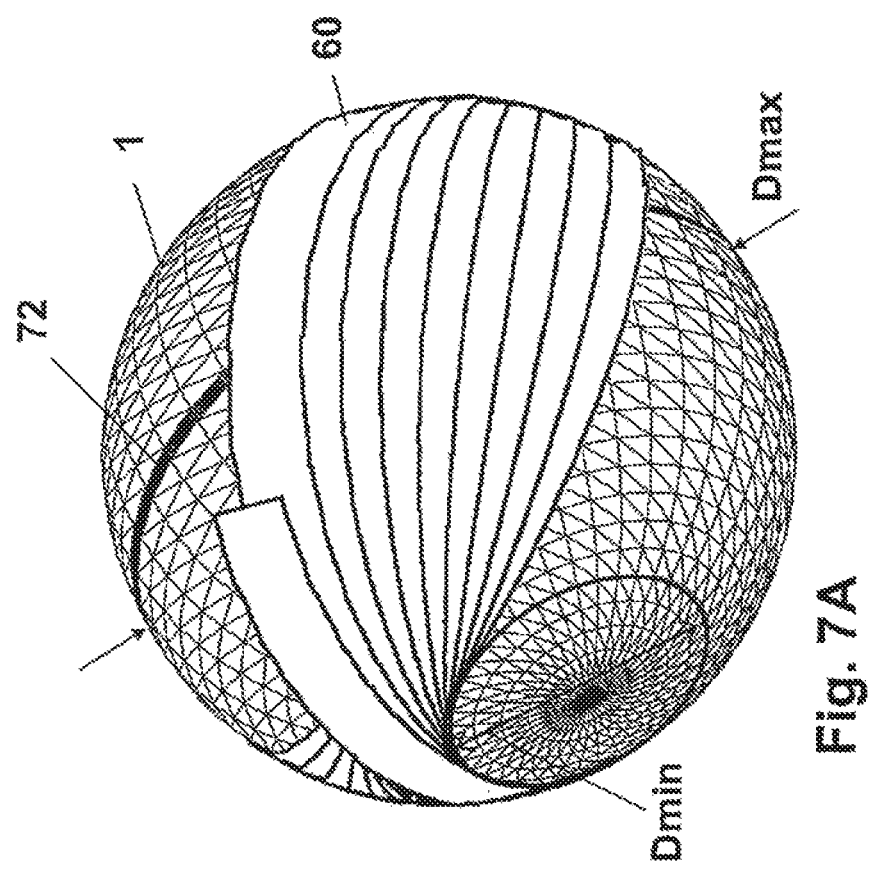

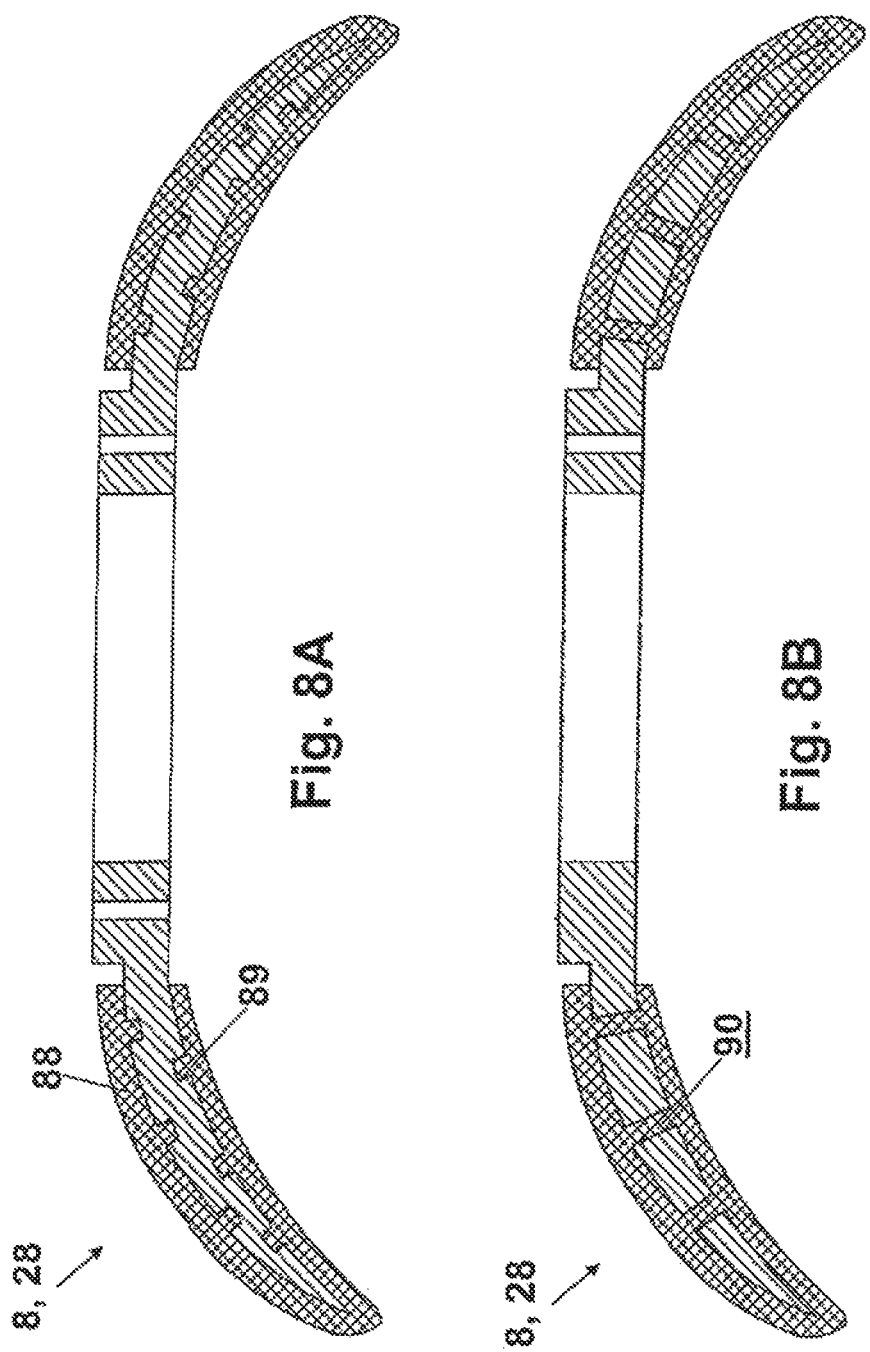

METHOD FOR PRODUCING A LEAK-TIGHT VESSEL, AND A LEAK-TIGHT VESSEL

RELATED APPLICATIONS

This application is a divisional application of U.S. patent application Ser. No. 13/698,287, filed on May 13, 2011, which is a § 371 National Phase Application of International Application No. PCT/BE2011/00029, filed on May 13, 2011, now International Publication No. WO 2011/143723, published on Nov. 24, 2011, which International Application claims priority to International Application No. PCT/EP2010/056695, filed on May 17, 2010; International Application No. PCT/EP2010/056696, filed on May 17, 2010; and International Application No. PCT/EP2010/056699, filed on May 17, 2010.

TECHNICAL FIELD

The invention relates to a method for producing a leak-tight vessel having a predetermined permeability for holding a gas and/or liquid, in particular a fibrous reinforced leak-tight vessel, and to a leak-tight vessel produced in this way.

BACKGROUND ART

Leak tight vessels comprising a fiber reinforced material as their wall structure and methods for producing them are known in the art.

With "leak-tight vessel" is meant a substantially liquid-tight vessel or a substantially gas-tight vessel or both, wherein the permeability of the vessel for the liquid and/or gas to be stored inside the vessel is below a maximum prescribed limit for the given application the vessel is intended for. For example, in case the application is a hot water boiler application, the relevant permeability is the permeability of hot water under the intended storage conditions (e.g. temperature, pressure).

With "gas and/or liquid tight" is meant that it can be gas tight, or liquid tight, or both, depending on the intended application.

A known method for making leak-tight vessels, in particular pressure vessels, uses filament winding of continuous fibers impregnated with a thermoset resin over an inner bottle (also called "liner") that will remain in the vessel after the filament winding step. The inner bottle is sufficiently rigid to be tightly overwrapped with continuous fibers, and is quite thick (e.g. 1-4 cm) to act as the gas and/or liquid barrier. A disadvantage of such a method is that the bottle (liner) is heavy and expensive.

Various methods for producing leak-tight vessels are known in the art. In one of these methods continuous fibers impregnated with a thermoset resin are filament wound over a plastic inner bottle (also called "liner") that will remain in the leak-tight vessel after the production. Because during filament winding of continuous fibers a large pressure is exerted upon the object being wound, the plastic bottle needs to be sufficiently thick (e.g. >1 cm thick for a diameter of about 50 cm). At the same time, such a bottle also acts as the gas and/or liquid barrier for the leak-tight vessel, while the fibers wound around the bottle act as a protection layer. When producing pressure vessels, the bottle is usually made of a thermoplastic material, in order to avoid cracks due to the internal pressure. While such a bottle can provide a high barrier for the gas and/or liquid, it is heavy and expensive.

U.S. Pat. No. 4,760,949 describes a composite container for storage of products at non-atmospheric conditions. The composite container has a high barrier liner layer including a metal layer of vacuum deposited aluminum parallel with and spaced from the longitudinal edge of a synthetic plastic base thereby to define a first web that is helically wound around a cylinder in edge overlapping relation such that one longitudinal edge of the metal strip overlaps the other longitudinal edge of the metal strip by a given constant distance (d). The overlapping edges of the first web are hermetically joined by a heat-sealable bond between an adhesive layer covering the metal strip and the adjacent face of the first web, and a compatible heat sealable layer on the opposite face of the web. The method applies filament winding around a cylinder. After the fibrous cylindrical wall is removed from the mandrel, metal end parts are added to form a leak-tight vessel, and an end sealing compound is provided between the composite wall and the metal end part so as to obtain a hermetical connection.

A disadvantage of this method is that such a leak-tight vessel is not suitable to withstand high pressure (e.g. 2 bar or more). U.S. Pat. No. 3,367,815 entitled method and apparatus for forming filament wound vessels, patented Feb. 6, 1968, describes a method for forming a filament wound vessel comprising following steps:

Forming a first wound shell of resin impregnated filaments about a collapsible mandrel having a detachable fitting;
Curing the first shell to bond the fitting to the shell;
Removing the mandrel;
Mounting the fitting and shell on a shaft;
Forming a second wound shell of resin impregnated filaments amount the first shell while using the latter as a mandrel;
Curing the vessel. (abstract)

The method described above is meant to solve the problems related to the use of an inflatable mandrel (column 1, lines 50-55), or a meltable or soluble mandrel (column 2, line 2).

Another prior art solution was the use of a 'lost' mandrel, left behind in the finished vessel (column 2, line 25).

A specific characteristic of this disclosure is that the partially wound shell, resulting from the above two first process steps, serves as a forming mandrel during the subsequent process steps. This procedure is said to permit removal of the relatively bulky mandrel components from the interior of the shell prior to the time that the latter is completely formed (column 2, lines 60-66).

Differently phrased, and as set out in column 3, lines 5-7, the mandrel components are removed from the interior of the vessel during the manufacture process thereof. This essential feature of the invention so disclosed is repeated in other terms again in column 3, lines 25-30 and column 4, lines 66-70, column 8 line 6 and again on line 19, column 10, lines 44-46, column 12, lines 40-41.

At least two disadvantages are imminently related to the process as disclosed in this prior art document.

The first is that although use is made of a reusable mandrel, such mandrel is not used during the entire manufacturing process. It is quite clear that from a mechanical point of view a reusable mandrel is a complicated and hence expensive piece of equipment. Also given this mechanical complication, its assembly and disassembly requires costly production time, and therefore using such piece of equipment during only a part of the manufacturing process of a fibrous vessel is in itself an inefficient operation.

Secondly, as the first wound shell resulting from the first two steps of this manufacturing process is used as a mandrel during the next manufacturing steps, such wound shell must exhibit a sufficient rigidity to effectively serve as mandrel during the subsequent winding process. Hence the thickness of the shell layer wound in the first two process steps must be thick enough to yield such rigidity. As a result the fibrous vessel produced according to this method is rather heavy weight, and the benefits of the expensive reusable mandrel used in this process are only partly used, thereby rendering this manufacturing method and the resulting fibrous vessels rather expensive.

GB Patent 1 255 738 entitled 'A flexible and collapsible container and method of making the same', complete specification published Dec. 1, 1971, describes a method for forming a yarn wound container comprising the following steps:

Preparing a metal former including separate component elements and annular clamps;

Applying a first coating of a thermoplastic synthetic resin;

Heat treating the coated former;

Winding on to the coated former a plurality of layers of flexible yarn;

Applying a second coating of thermoplastic resin to form an outer layer;

Heating the outer and inner coating layers so as to integrate the said coatings;

Removing the former by dividing it into its individual elements.

(Page 1, line 31 until line 58)

Page 2, lines 113-117 teach heating the metal former to a selected temperature whereupon a thermoplastic synthetic resin is applied to its surface to form a coating.

The wall of the container so formed is constituted by windings of flexible yarn and an inner and outer layer of a pliable thermoplastic synthetic resin. Therefore the walls of the container itself are flexible and the container is collapsible. (page 2, lines 53-60).

A container manufactured according to this manufacturing process however clearly is not gas and/or liquid tight, as nowhere during the manufacturing process any measure or precaution in this respect has been made, nor have the materials that are used in this manufacturing process been selected with this aim in mind.

Also this manufacturing process implies, apart from the assembly and final disassembly of the former or mandrel, at least five subsequent steps, two coating application steps, one winding step and two heating steps. The overall manufacturing process hence is quite lengthy, and the resulting manufacturing cost of the containers consequently is high.

U.S. Pat. No. 3,334,780 entitled Pressure fluid container, patented Aug. 8, 1967, describes improved pressure fluid container constructions which preclude build-up of excessive internal pressures.

More specifically, the object of this disclosure is the provision of a pressure fluid container which, although fluid-impervious at normal temperature conditions, becomes fluid-pervious upon subjection to ambient temperatures above a known critical level. Thereby controlled escape of the fluid contents of the container and thus control of and limiting of pressure rise within the container is permitted (column 2, lines 6-11).

To this end, filaments are wound about a mandrel, such filaments being either moistened or impregnated with a suitable binder such as epoxy resin before, during or after the winding operation. After such a shell of predetermined thickness is formed, the resin is cured (column 4, lines 9-16). As a final step, the mandrel is removed through a large polar opening (column 4, line 20).

In carrying out the above, provision is made for closing the polar opening by means of a porous or fluid pervious material (column 4, lines 26-28). Also, the outer shell which envelops the inner shell, is porous, at least in the region surrounding the polar opening (column 4, lines 38-40).

The solution proposed in this disclosure however is quite difficult to realize in practical manufacturing conditions.

U.S. Pat. No. 3,508,677 entitled vessel for storing high-pressure gases, patented Apr. 28, 1970, discloses a vessel for storing gases under extreme pressure conditions as required e.g. in military aircraft.

Such vessel comprises three different layers: an inner layer comprising a thermoplastic resin liner; an intermediate diaphragm bonded to the inner liner; an exterior housing composed of various layers of resin impregnated fiber glass strands.

The manufacturing method for this type of vessel is based on the use of a water soluble mandrel (column 2, line 71). Given the specific application field for the vessels manufactured according to the method of this patent (military aircraft, aircraft fuselage), manufacturing cost is not the top priority. Key here is the ability for the vessel to store gases under extremely high pressures ((Column 1, line 26). Hence a one-time soluble mandrel can be used, but it is quite clear that the use of such one time-use mandrels for most commercial applications is not affordable. Also the inner liner consists of pre-formed laminated resin sheet sections that are joined to form an impermeable inner liner, again adding to the overall cost of the vessels manufactured according to this disclosure (FIG. 3).

Finally the inner layer of this type of vessels remains flexible so that it is capable of expanding and contracting when under pressure arises and/or pressure is released during use. Such inner flexibility however often gives rise to damage to the inner layer, whereby the vessel loses its leak-tight characteristic. For one-time use vessels as disclosed in the application field of this invention, this is not a concern, but for most commercial applications, the vessel should retain its gas and/or liquid tight property during extended periods of use.

DISCLOSURE OF THE INVENTION

It is an object of the present invention to provide a method for producing a leak-tight vessel and a leak tight vessel produced according to such method, thereby avoiding the disadvantages and problems associated with the prior art vessels and manufacturing methods described above.

More particularly, it is an object of the present invention to provide leak-tight vessels and their manufacturing methods, able to resist a pressure higher than 2 bar, and that has a similar barrier effect as the bottle, but without using a liner bottle.

After years of experimenting the inventor has found such a method.

This is achieved according to the present invention with the method of the first claim.

As will become clear further, the disclosed method and the disclosed leak-tight vessel thus obtained are also very well suited for producing leak-tight vessels or containers used for storage of liquids under atmospheric conditions.

Thereto, the method of the present invention comprises producing a leak-tight vessel (14) for holding a gas and/or liquid, comprising the steps of:

(a) assembling a reusable and removable mandrel (1) having a rounded outer surface suitable for filament winding;

(b) applying an end fitting (8) to the mandrel (1), said end fitting having an opening (74) large enough for removing the mandrel (1) there through after being disassembled;

(c) forming a barrier layer by winding a barrier strip (60) around the mandrel (1) and the end fitting (8), thereby completely covering a predefined area of the rounded outer surface of the mandrel and the end fitting, while leaving the opening (4) large enough for removing the mandrel (1) after disassembly, whereby the winding of the barrier strip (60) is applied such that the successive barrier strip windings (61) overlap over at least a lateral overlapping distance (66) with a previously wound parallel barrier strip winding (62) and a next wound parallel barrier strip winding (63);

(d) forming a shell layer (41) by winding a fibrous material (12) over the barrier layer while leaving the opening (4) large enough for removing the mandrel (1) after disassembly, thereby exerting pressure upon the wound barrier layer so that the successive windings (61) of the barrier strip (60) are pressed tightly against the mandrel (1) and against each other so that the materials of such successive windings (61, 62, 63) can be consolidated at their contacting surfaces;

(e) consolidating the successive windings of the barrier strip (61) thereby forming a gas and/or liquid tight layer (49), this step (e) being performed either during and/or following step (c), and/or this step (e) being performed following step (d);

(f) consolidating the gas and/or liquid tight layer formed in step (e) with the end fitting, thereby forming a hermetical gas and/or liquid tight connection with such end fitting, this step (f) being performed either concomitantly with and/or following step (e);

(g) consolidating the wound shell layer (41) formed in step (d) with the gas and/or liquid tight barrier layer formed in step (e) so as to form a consolidated wall structure, this step (g) being performed either concomitantly with and/or following either steps (e) or (f);

(h) disassembling and removing the mandrel (1) through the opening (4).

Further, according to the invention, leak-tight vessels with the following characteristics are produced.

A leak-tight vessel (14) for holding a gas and/or a liquid, comprising an inner barrier layer comprising a heat-sealable thermoplastic material, an outer shell layer comprising a fibre-reinforced heat-sealable thermoplastic material, an end fitting positioned at the inner side of the inner barrier layer, covered at least partly at its outer concave surface with a heat-sealable thermoplastic material, wherein the inner barrier layer, the outer shell layer and the end fitting form a unitary rigid structure able to withstand an overpressure of at least 2 bar.

Preferably, the heat-sealable thermoplastic materials selected for the inner barrier layer, the outer shell layer, and the covering of the concave outer surface of the end fitting, should be selected to as to be compatible during the consolidation steps as described hereafter. More preferably their softening and/or melting points should be compatible, i.e. situated in the same or neighbouring temperature ranges to enable a smooth consolidation.

As used herein, with "consolidation of two or more materials" is meant unification or leak-tight connection, e.g. in the context of two thermoplastic materials consolidation can mean uniting under high temperature by local melting or softening; e.g. in the context of consolidating a plastic material with a metal material, consolidation can mean melting against the metal surface, or gluing to the metal surface.

By providing a removable mandrel it is possible to apply filament winding without the need for a bottle (or "liner") with a strong (thus thick and heavy and expensive) wall to enable filament winding thereto. By winding a barrier strip around the mandrel, the thickness of the gas and/or liquid tight layer can be chosen independently of the size of the vessel, in contrast to the traditional approach, where the thickness of the bottle wall needs to increase for larger vessels in order to maintain sufficient stability for the winding process.

Further, thanks to the use of the mandrel, the filament wound material can be a thermoplastic material, which was not possible when using a thermoplastic bottle (liner), because it would weaken. This allows more materials to be used for the leak-tight vessel.

Due to the fact that the mandrel can be disassembled, the parts of the mandrel can be removed through the opening (74) after disassembly, irrespective of the shape the mandrel had during the winding step. This allows a mandrel with a shape different from a cylindrical shape while still being able to separate the vessel from the mandrel.

By providing a mandrel with a varying outer diameter the top and bottom parts can have a diameter smaller than the maximum outer diameter of the vessel, and can be over-wrapped by the fibrous material thereby so as to be able to resist high pressure (e.g. more than 2 bar, or even 10 bar, or even 25 bar, or even 50 bar).

The inventor has surprisingly found that by winding a three-layer barrier strip of width W in an overlapping way as described above, a gas and/or liquid tight layer can be provided having similar barrier properties as an inner bottle ("liner") with a solid wall thickness of approximately W. By choosing proper materials for the barrier strip and by choosing the lateral overlapping distance large enough (e.g. 50% of the width of the strip), the permeability obtained can be determined mainly by the width W of the strip and not by its thickness. In this way a strip with a thickness of e.g. 800 μm and a width of 4 cm using an overlap of 50% can achieve a similar barrier effect as an inner bottle of 4 cm thickness made of the same material as the first and/or second layer of the barrier strip!

The inventor has surprisingly found that a high barrier effect can be achieved even when the strip fragments are inter-woven in a way that substantially parallel strip fragments are separated by crossing strip fragments, sometimes only several windings later. Experiments have shown that the high barrier effect is still achieved by providing the above mentioned minimum overlapping distance, even though the overlapping distance is not constant on a non-cylindrical mandrel, provided that the strip fragments are consolidated to each other, which the inventor has observed can be achieved by exerting pressure upon the barrier strip fragments by filament winding the fibrous material at a larger tension than usual (in case the filament winding would be applied directly around a mandrel), so that the strip fragments are tightly pressed against the mandrel and to each other. This is important when using a non-cylindrical mandrel because the strip fragments do not in themselves show perfect contact with the rounded outer surface area, especially at their longitudinal edges.

As an additional advantage, the method of winding the barrier strip as described above can be fully automated, using the same equipment as used for the filament winding of fibrous material, thereby avoiding extra investment costs and factory space.

Another advantage of winding a barrier strip instead of using a bottle (liner) is that a barrier strip of a given width W can be used for vessels of different sizes, which is not the case when using "bottles", which have a fixed size. This offers a great advantage in logistics, stock and flexibility in production.

In addition, vessels with a higher barrier (also called impermeability) can be produced in a very fast and economical way by simply repeating the winding process so as to cover the predefined area multiple times, without noticeably increasing the weight of the vessel. In this way the useful lifetime of the product (e.g. a hot water boiler before leakage takes place) can be largely increased at only a minor additional cost.

Another advantage of the method according to the present invention is that the entire process for producing a leak-tight vessel including the consolidation can be performed in about 1-3 hours, as compared to 1-3 days required for a blow molded bottle (liner) of 4 mm thickness to completely shrink before it can be filament wound In a preferred embodiment the end fitting is applied in the form of a dome shaped end fitting having an outer peripheral (82) larger than the first opening and having an opening large enough for removing the mandrel there through after being disassembled. In a further preferred embodiment, the opening is positioned in alignment with the opening, and whereby the fibrous material is applied in such a way as to overlap at least the outer peripheral of the end fitting.

By winding the fibrous material in such a way as to overlap at least the outer peripheral of the end fitting, an excellent mechanical hold is provided of the end fitting against internal pressure from inside the leak-tight vessel. In this way a pressure vessel can be produced that can withstand an elevated internal pressure (e.g. 2, 10, 25 or even 50 bar).

By providing a large overlapping area, preferably the entire end fitting except for the opening, the force exerted upon the end fitting to counteract the internal pressure can be distributed over a larger area, thereby reducing the stress exerted upon the end fitting.

By applying the end fitting before the filament winding of the fibrous material, the end fitting is integrated into the wall structure during the construction of the wall, and an extra processing step for adding a top and/or bottom part afterwards can be omitted, thus reducing the risk of leakage, but also saving considerable time, production space and energy.

Preferably the barrier strip is applied as a single continuous strip, as this saves time in production, and avoids leakage at the location where the inner barrier layer would otherwise be interrupted.

Preferably the barrier strip has a predefined width W, and is applied in such a way that the lateral overlapping distance measured at the equatorial of the mandrel is 10%-90% of the width of the barrier strip, preferably 20%-80%, more preferably 30%-70%, even more preferably 40%-60%, even more preferably 45%-55%, most preferably about 50%. The inventor has found that the value of 50% is an optimal overlapping distance in terms of barrier effect versus the amount of strip-material required to achieve that effect.

With equatorial is meant the ring-shaped outer boundary of the cross-section of the rotation symmetric three dimensional mandrel, perpendicular to its symmetry axis, at the mandrel's midpoint or point of greatest radius (as in the equator of the Earth).

The end fitting is applied to the mandrel before winding the barrier strip, and the barrier strip is applied in such a way as to overlap the entire outer peripheral of the end fitting, and the method further comprises a step of consolidating the plastic material of the barrier strips with the material of the end fitting so as to form the hermetical connection.

In this way the end fitting is mounted on the inside of the gas and/or liquid tight layer, and is hermetically joined thereto by consolidation.

Alternatively the end fitting is applied on top of the wound barrier strip but before the step of winding the fibrous material. So, according to this alternative embodiment of the invention, the barrier strip material is first wound on the mandrel, followed by the step of applying the end fitting on this wound barrier layer, followed by the step of winding the fibrous material hereupon.

In this alternative way the end fitting is mounted partially between the fibrous layer and the gas and/or liquid tight layer, and is hermetically joined to both by consolidation.

Preferably the fibrous material is applied by filament winding of continuous thermoplastic fibres. These fibres may be thermoplastic fibres reinforced with carbon, glass or stretched thermoplastic fibres. By winding continuous fibres, the obtained endless filament structure will allow the vessel to withstand higher hydrostatic pressures. In this way a leak-tight vessel can be produced able to withstand very high internal pressure, e.g. up to 100 bar or even 200 bar or more.

The method further comprises a step of consolidating the plastic materials of the barrier layer and the shell layer, so as to create a consolidated wall structure. By consolidating the plastic material of the gas and/or liquid tight layer to the plastic material of the fibrous wall, good fastening of the gas and/or liquid tight layer to the fibrous outer wall is obtained, which prevents it from coming loose e.g. in case of underpressure or even vacuum inside the vessel.

Preferably the method further comprises a step of consolidating the plastic material of the shell layer and the material of the end fitting, so as to obtain a consolidated leak-tight vessel. By choosing compatible materials, such as thermoplastic sealable materials, the gas and/or liquid tight layer, the end fitting and the fibrous wall can all be consolidated together, resulting in a consolidated leak-tight vessel with excellent mechanical properties.

It is also an object of the present invention to provide such a leak tight vessel.

Preferably the varying outer diameter D has a maximum outer diameter Dmax, and the width W of the barrier strip is 4%-20% of the maximum outer diameter, preferably 6%-15%, more preferably 8%-12%, most preferably about 10%. By choosing a strip with such a width a good compromise is reached between low production time and quality of the vessel. A wider strip would require less time to wind, but would require more strip-deformation resulting in an increased risk of air inclusion, resulting in a lower barrier effect, and an increased risk of leakage.

According to a preferred embodiment, the barrier layer structurally comprises three distinct layers. Such a multilayer strip then comprises a first and second layer, and an inner layer of the barrier strip. The material chosen for the first and second layers on the one hand, and the material chosen for the inner layer must not necessarily be one and the same.

In one very interesting combination using only plastic materials the barrier strip is a multi-layer strip and the first resp. second plastic material is a first resp. second thermoplastic material with a first resp. second melting temperature, and the third material is a third thermoplastic material having a melting temperature higher than the first melting temperature and higher than the second melting temperature. A vessel having only thermoplastic materials has a higher impact resistance, and is better recyclable. The thermoplastic material chosen for the first and second layer may be identical, having a melting point lower than the melting point of the thermoplastic material chosen for the inner layer.

BRIEF DESCRIPTION OF THE DRAWINGS

The invention is further elucidated in the appending figures and figure description explaining either a prior art technique or preferred embodiments of the invention. Note that the figures are not drawn to the scale. The figures are intended to describe the principles of the invention. Embodiments of the invention can use combinations of the different features and elements of different drawings.

FIG. 2C shows a practical implementation of the removable mandrel shown in FIG. 2B, whereby only one segment is shown for clarity. The elongated segments are held in position by pulling two spindle parts away from each other. A bottom and top end fitting are applied to the mandrel in this figure.

FIG. 2D shows the releasable connection of the segments of the mandrel of FIG. 2C in more detail.

FIG. 3A shows the mandrel of FIG. 2A at an early stage of production of a leak-tight vessel according to the invention, during the winding of a barrier strip around the mandrel.

FIG. 3B shows the structure of FIG. 3A at a later stage of production, still during the winding of the barrier strip around the mandrel. (only the strip is shown, the mandrel itself is hidden)

FIG. 3C shows in more detail two substantially parallel strip fragments of the barrier strip of FIG. 3B.

FIG. 3D shows in more detail two substantially parallel strip fragments inter-woven with a crossing strip fragment.

FIG. 3E shows the structure of FIG. 3B after the barrier strip is completely wound around the mandrel. (only the strip is shown, the mandrel itself is hidden)

FIG. 3F shows the position of the center-lines of the strip fragments of FIG. 3E.

FIG. 3G shows a top view on the structure of FIG. 3E.

FIG. 3H shows in more detail two substantially parallel strip fragments of the barrier strip of FIG. 3G.

FIG. 3I shows the position of the center-lines of the strip fragments of FIG. 3G.

FIG. 4A shows a leak-tight vessel according to the invention, whereby the end fitting is located on the inside of both the gas and/or liquid tight layer and the fibrous material layer.

FIG. 4B shows an alternative embodiment of a leak-tight vessel, comprising an end fitting partially located between the gas and/or liquid tight layer and the fibrous material layer.

FIG. 6A shows a wall structure of a leak-tight vessel according to the present invention.

FIG. 6B shows a detailed cross section of a part of the wall structure of FIG. 6A.

FIG. 6C shows in more detail an example of a stack-up of strip fragments forming the gas and/or liquid tight layer of FIG. 6B, showing substantially parallel and crossing strip fragments.

FIG. 7A shows another (spherical) mandrel being wound by a continuous strip for producing a leak-tight vessel according to the present invention, at an intermediate stage of the production thereof, during the winding of a barrier strip around the mandrel.

FIG. 8A shows a first embodiment of an end fitting comprising a metal material partly surrounded by a plastic material.

FIG. 8B shows a second embodiment of an end fitting comprising a metal material partly surrounded by a plastic material. (toegevoegd tov word versie, stond reeds in paper print-out).

DETAILED DESCRIPTION

Figure 1:
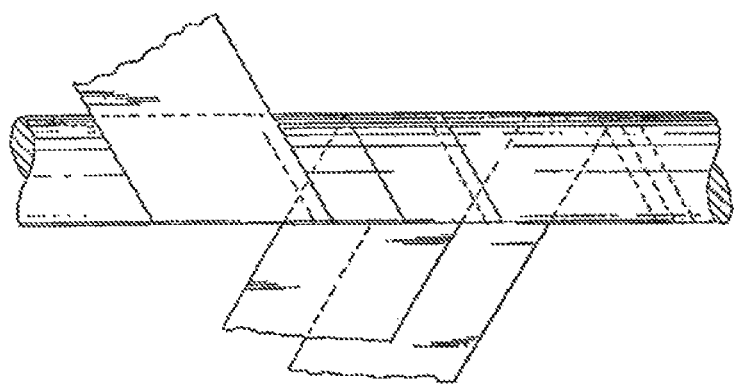
FIG. 1 shows a cylindrical mandrel being wound with a barrier strip, as known in the art.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention. The drawings are intended to describe the principles of the invention. Embodiments of the invention can use combinations of the different features and elements with the same reference number of different drawings.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present invention, the only relevant components of the device are A and B.

Figure 5A:
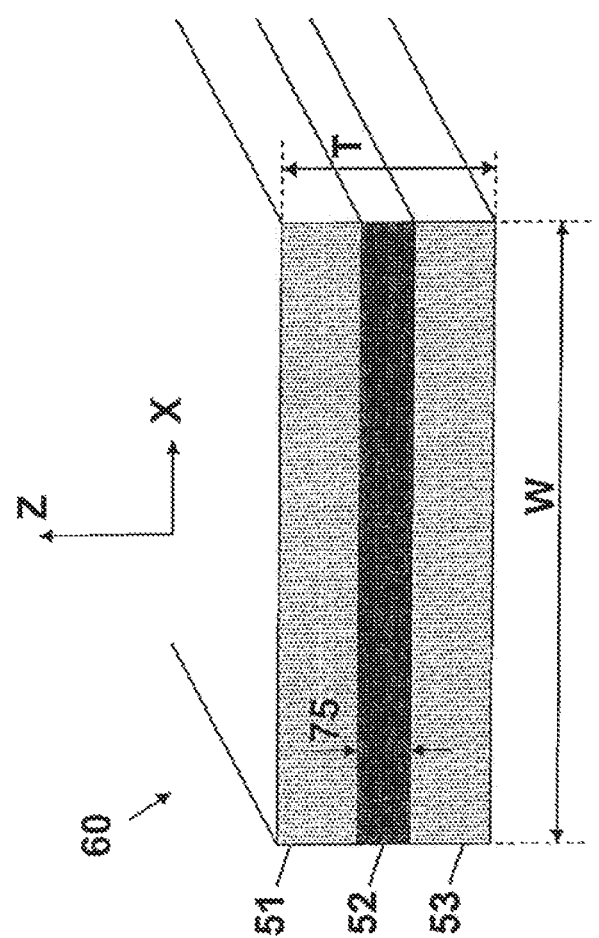
FIG. 5A shows a cross section of a preferred embodiment of a barrier strip that can be used for the production of a leak-tight vessel according to the invention. It has an inner layer located between a first layer and a second layer.

A leak-tight vessel 14 according to the invention can be produced by making use of a removable mandrel 1 as shown in FIGS. 2A-2E, and by winding a barrier strip 60 of e.g. 800 μm thick and having either a single layer or several layers (as shown in FIG. 5A) in a particular way around the mandrel 1 (as shown e.g. in 3E), whereby strip fragments 61 of the barrier strip 60 are wound in an overlapping and crossing manner as shown in FIG. 3B-3D. After consolidation of the overlapping strip fragments 61, 62, 63 a gas and/or liquid tight layer 49 is formed, which will be located on the inside of the leak-tight vessel 14. Around this gas and/or liquid tight layer 49 a shell layer 12 comprising a fibrous material, preferably comprising continuous fibers impregnated with a plastic material, is wound. Furthermore at least one end fitting 8 (e.g. as shown in FIG. 2F or 2G) is applied to the mandrel 1 before winding the barrier strip 60, which end fitting 8 has an opening 74 for removing the parts of the mandrel 1 after disassembly thereof. The result of this method is shown in FIG. 4A, showing an embodiment of a leak-tight vessel 14 according to the invention. Even though these leak-tight vessels 14 can have a very thin wall (typically less than 8 mm thick at their equatorial), if proper materials are chosen, they can resist pressure higher than 2 bar (e.g. 10 or 25 or 50 bar or even more) and have similar barrier characteristics (impermeability for the gas and/or liquid to be contained inside the leak-tight vessel) as a prior art vessel with a bottle (liner), or even more. Further, thanks to the consolidated wall structure between the outer shell layer and the inner barrier layer, and the unified consolidated structure with the end fitting, the leak-tight vessels according to the invention are also able to withstand a (temporary or accidental) internal underpressure.

The method according to the invention will now be described in more detail.

Figure 2A:
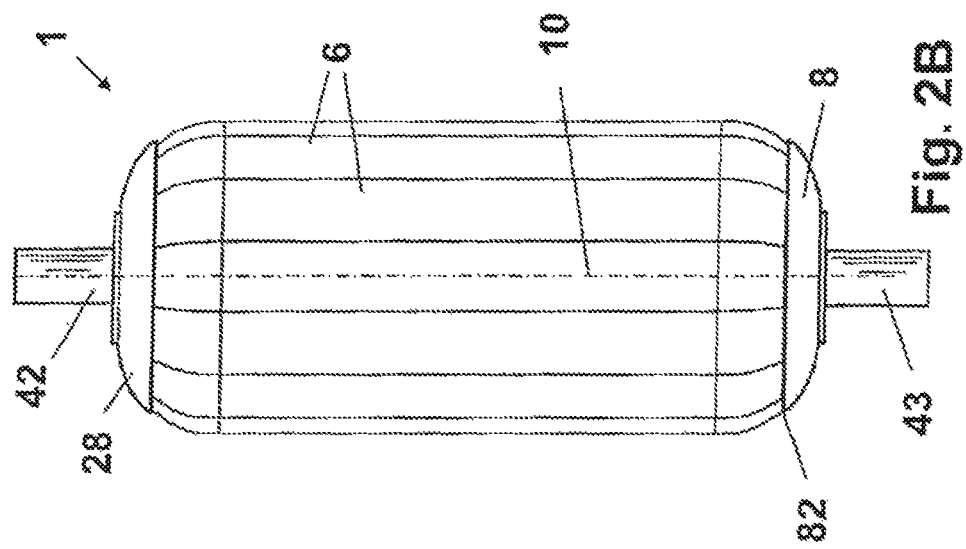
FIG. 2A shows a removable mandrel with a rounded outer surface suitable for filament winding, as can be used for producing a leak-tight vessel according to the invention.

FIG. 2A shows a removable mandrel 1 as can be used in the method of the present invention. The mandrel comprises fourteen elongated segments 6 that are placed side by side to form a rounded outer surface. The mandrel 1 has a rotation symmetrical shape with a varying outer diameter D around a symmetry axis 10, and is suitable for filament winding. Because the mandrel can be disassembled and removed, the mandrel is allowed to have a varying diameter D, while still being able to separate the structure wound around the mandrel from the mandrel itself after the winding process. This provides for flexibility in the choice of shapes of the leak-tight vessels 14 to be produced, not just cylindrical, but e.g. also spherical or ellipsoidal, or other shapes.

Figure 2B:
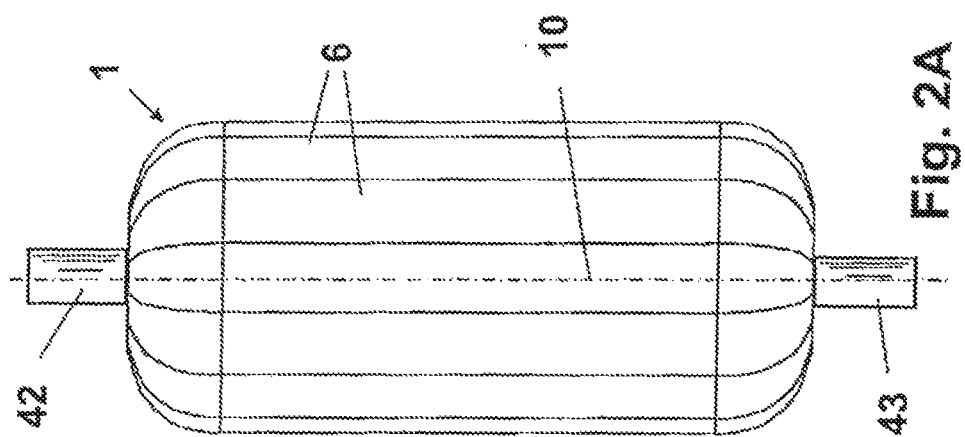
FIG. 2B shows the mandrel of FIG. 2A two end fittings are applied, one at the bottom, the other at the top.
Figure 2F:
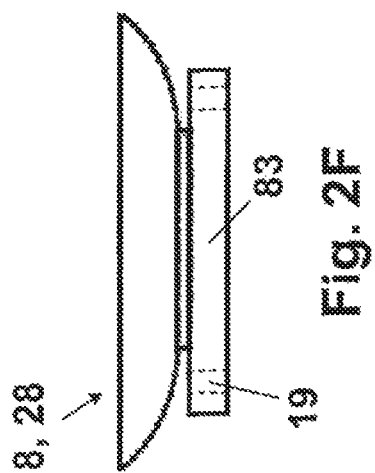
FIG. 2F shows a detailed view of another dome shaped end fitting that can be used in combination with the mandrel of FIG. 2A, this end fitting having a flange for connection to external tubing.

FIG. 2B shows the removable mandrel 1 of FIG. 2A after two end fittings 8, 28 are applied to it. According to the invention, at least one such end fitting 8 or 28, positioned either on top or at the bottom of the mandrel should be present. A barrier strip 60 can be wound around the mandrel 1 after applying such an end fitting. In principle, according to an alternative embodiment, such an end fitting could be applied after the winding of the barrier layer, and before the winding of the shell layer. As a result the end fitting (s) are then positioned between the barrier layer and the shell layer, although this embodiment is less preferred.

FIG. 2C shows a practical implementation of such a removable mandrel 1 in detail. It comprises a plurality of elongated segments 6 held in position by pulling two spindle parts 42, 43 away from each other, whereby segment holders 7 are mounted to the spindle parts 42, 43 for engaging with opposite ends of the segments 6.

The mandrel 1 is shown together with two end fittings 8, 28. As already mentioned before, one end fittings 8 or, 28 is sufficient. According to the alternative embodiment, either or both of the end fittings can also be placed on the mandrel 1 after the winding of the barrier strip 60.

Preferably the elongated segments 6 of the mandrel 1 are made of metal, preferably a lightweight metal such as aluminium or an aluminium alloy, as this is easier to manipulate during assembly and disassembly of the mandrel 1, but other metals can also be used, such as e.g. steel or stainless steel.

In an embodiment the end fitting 8 consists of a plastic material. Such an end fitting 8 might be well suited for producing a small size, lightweight leak-tight vessel 14 (e.g. 6, 8, 10 kg for a leak-tight vessel 14 with an inner volume of 100, 150, 300 litre respectively) to be subjected to moderate pressure (e.g. <5 bar). In another embodiment the end fitting 8 consists of metal, e.g. stainless steel. In another embodiment the end fitting 8 comprises a metal material at least partly covered by a plastic material, e.g. a metal inner core completely or partly surrounded by the plastic material, whereby the metal serves primarily as a mechanical reinforcement to the end fitting 8. Such an end fitting is especially suited for producing leak tight vessels 14 that need to resist high pressure (e.g. >50 bar), and/or have a relatively large diameter (e.g. Dmin>80 cm), and/or need a strong connection with external pipes. In yet another embodiment the end fitting 8 comprises a plastic material and reinforcing fibres, e.g. chopped glass fibres. Such a fibre reinforced end fitting whereby the plastic material acts as matrix material is considerably stronger than a pure plastic end fitting, and is suited for a wide range of applications where a pure plastic end fitting is not strong enough but an end fitting comprising metal is not required.

In FIG. 2C only one (out of fourteen) segments 6 and only two (out of eight) segment holders 7, four on each side, are shown for clarity reasons. The person skilled in the art can choose another number of segments 6 or segment holders 7 using the same principle.

FIG. 2D gives an enlarged view on the releasable connection of the first spindle part 42, the segment holder 7 and the segment 6. As shown, the first spindle part 42 has a circumferential groove 44, and the segment holder 7 has a circular protrusion 46 that fits in the groove 44. The segment 6 preferably has a curved or bended edge 47 that engages in a groove 45 of the segment holder 7. Preferably the first and second spindle parts 42, 43 are hollow tubes, so that the segment holders 7 can be manually placed on or removed from the first spindle part 42 e.g. by inserting a hand in the tube. After all segments 6 and segment holders 7 are placed on the first and second spindle parts 42, 43, the end fittings 8, 28 each having an opening 74 (see FIG. 2F), can then be shifted over the first resp. second spindle part 42, 43. The pulling of the first and second spindle parts 42, 43 in opposite directions can be implemented e.g. on the filament winding machine (not shown).

Disassembly of the mandrel after a leak-tight vessel 14 (not shown) is produced can be done as follows: pushing the spindle parts 42, 43 slightly inside the vessel 14, removing the segment holders 7 from the spindle parts 42, 43 (e.g. by inserting a hand inside the hollow spindle part), extracting the spindle parts 42, 43 out of the vessel 14, removing the segment holders 7 and the segments 6 out of the vessel 14 through the opening 74, while leaving the end fittings 8, 28 inside the vessel 14.

Figure 2E:
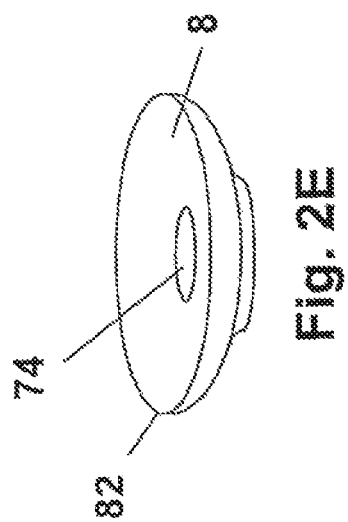
FIG. 2E shows a detailed view of a dome shaped end fitting that can be used in combination with the mandrel of FIG. 2A.

FIG. 2E shows an embodiment of the end fitting 8 or end fitting 28 that can be used in conjunction with the mandrel of FIG. 2A. The end fittings 8 and/or, 28 can have the same size and geometry or a different size and geometry. As indicated supra, according to the invention, the end fittings 8 and/or 28 are applied before the winding step of the barrier material. When mounted to the mandrel 1 before winding the barrier material, at least one of the end fittings 8, 28 needs to have an opening large enough to enable the disassembly and removal of a re-usable and re-movable mandrel used during the manufacture of the leak tight vessel. In particular such opening should allow passage of the elements of the mandrel 1, e.g. in case of the mandrel shown in FIG. 2C: the segments 6, the segment holders 7, the first spindle part 41 and the second spindle part 43. To enable the above, such opening should neither be covered by the inner barrier layer, nor by the outer shell layer during the winding operations as described hereinafter.

In a preferred embodiment, the outer peripheral (82) of the end fitting is dimensioned such that by covering the outer concave side of the end fitting outside the opening (74) up to said outer peripheral (82) by the inner barrier layer and the outer shell layer, the resulting rigid unitary structure formed by the inner barrier layer, the outer shell layer and the end fitting can withstand an overpressure of at least 2 bar. As a result, a predefined area, as set forth in the main method claim according to the invention, of the rounded outer surface of the mandrel and the end fitting is completely covered while leaving the opening (4) large enough for removing the mandrel after being disassembled.

FIG. 2F shows another embodiment of an end fitting 8, 28 having connection means such as a flange 83 with holes 19, positioned outside the vessel, for connection to the outside world, e.g. to connect external piping (not shown). The exact shape of the end fitting 8 can however be further modified by the person skilled in the art. It can for example have a flange with provisions for O-rings, or a hole with internal screw thread, or a V-clamp, or other fastening means. In a preferred embodiment, neither the end fitting nor the connection means comprise mechanical fastening means such as bolts and nuts, for securely integrating the end fitting and/or the connection means into the rigid unitary structure comprising the inner barrier layer, the outer shell layer and the end fitting.

FIG. 3A shows the mandrel 1 of FIG. 2A at an early stage of production of a leak-tight vessel 14 according to the invention, during the winding of a barrier strip 60 around the mandrel 1. This mandrel has a monotonically decreasing diameter D, ranging from Dmax at its equatorial 72 down to Dmin at its opposite ends. This is not absolutely required however for filament winding, although it is recommended for pressure vessels to avoid pressure concentrations. Preferably the barrier strip 60 is applied a single continuous strip, but in order to describe the barrier effect, the barrier strip 60 can be seen as composed of strip fragments, an arbitrary one being indicated by reference 61.

FIG. 3B shows the mandrel of FIG. 3A at a later stage of production of a leak-tight vessel 14, but still during the step of winding the barrier strip 60 around the mandrel 1. (only the barrier strip 60 is shown, the mandrel itself is hidden) This figure shows a screenshot taken of the barrier strip 60 being wound around the mandrel at a selected moment for better illustrating the overlapping and crossing of strip fragments 61. When comparing FIG. 3B with FIG. 3A it can be seen that the strip fragment 61 shown in FIG. 3A has a parallel overlapping strip fragment 62 in FIG. 3B. It can also be seen however, that meanwhile multiple crossing strip fragments 63 have been wound between strip fragments 61 and 62, which is called inter-weaving. As a result, the leak-tight vessel according to the invention comprises an inner barrier layer comprising consolidated at least partly overlapping strip fragments comprising a heat sealable thermoplastic material.

FIG. 3C shows in more detail the two substantially parallel strip fragments 61, 62 of FIG. 3B. The figure also shows the width W of the barrier strip 60, the predefined minimum overlapping distance 66 of the two strip fragments 61, 62, the center-lines 69 of the strip fragments, and the distance 67 between the center-lines 69. When the distance between the center-lines 67 approaches zero, the lateral overlapping distance 66 approaches the complete width W of the barrier strip 60.

FIG. 3D shows in more detail two substantially parallel strip fragments 61, 62 inter-woven with a crossing strip fragment 63. The crossing strip fragments 63 help to bend the strip edges of the strip fragments underneath towards the rounded outer surface of the mandrel 1.

FIG. 3E shows the structure of FIG. 3B after the barrier strip 60 is completely wound around the mandrel 1. (again only the barrier strip 60 is shown, the mandrel 1 itself is hidden). Note that the barrier strip 60 is wound around the mandrel while leaving an opening 4. According to the invention this opening 4 is chosen large enough to enable removal of the (parts of the) mandrel 1 after disassembly. When using the mandrel of FIG. 2C, this means the segments 6 and the segment holders 7, and the first and second spindle parts 42, 43. As can be seen from FIG. 3A the opening 4 can e.g. be a circle with a diameter Dmin.

FIG. 3F shows the position of the center-lines 69 of the strip fragments 61 of the barrier strip 60 of FIG. 3E. This figure illustrates that (for this shape of the mandrel) the lateral overlapping distance 66 is smallest at the equator 72, chosen to be approximately 50% of the strip width W in this case, where the distance between the center lines 69 is largest. And the overlapping distance 66 is largest (close to W) near the opening 4, where the distance 67 between the center lines 69 is smallest (close to zero).

FIG. 3G shows a top view on the structure of FIG. 3E, and FIG. 3H shows in more detail two substantially parallel strip fragments 61, 62 of the barrier strip of FIG. 3G. As can be seen from this figure, the lateral overlapping distance 66 of substantially parallel strip fragments 61, 62 close to the opening 4 is higher than the lateral overlapping distance 66 of substantially parallel strip segments near the equator 72.

This is also clearly visible in FIG. 3I showing that the distance between the center-lines 69 of the strip fragments is very close to zero near the opening 4, meaning that the overlapping distance 66 is very close to W, as explained before.

The FIGS. 2A-3I have shown the winding of the barrier strip 60. In a next step of the method according to the invention, a shell layer 12 is formed by filament winding a fibrous material over the wound strip layer (formed by the strip fragments), whereby the first opening 4 is left open for removal of the mandrel 1. The area covered by the fibrous material can be larger or smaller than the area covered by the barrier strip 60, but preferably is the same. During the winding of the fibrous material pressure is exerted upon the wound strip layer in order to press all strip fragments 61, 62, 63 to the mandrel 1 and to each other, so that contacting layers 51, 53 of overlapping strip fragments 61, 62, 63 can be consolidated together. The method further comprises a step of consolidating the plastic material of strip fragments 61 with the plastic material of overlapping strip fragments 62, 63 thereby forming a gas and/or liquid tight layer 49 having said predetermined permeability. According to the preferred embodiment of the invention, whereby the barrier strip comprises a three-layer construction, comprising a first, resp. second plastic material of strip fragments 62 and 63, the third material consisting of e.g. aluminium positioned in between such outer layers substantially contributes to such gas and/or liquid tight characteristic of the vessel according to our invention. After consolidation of the materials the mandrel 1 is disassembled and removed through the opening 4. The result is a leak-tight vessel 14 according to the invention, as shown in FIG. 4A or FIG. 4B.

FIG. 4A shows an embodiment of a leak-tight vessel 14 according to the invention, whereby the end fitting 8 is located on the inside of the gas and/or liquid tight layer 49. In this case the gas and/or liquid tight layer 49 forms a first layer around the inner volume 73, and the shell layer comprising fibrous material 12 is wrapped around the gas and/or liquid tight layer 49, and is consolidated thereto. In a preferred embodiment the outer shell layer 12 consists of longitudinal fibers (e.g. glass fibers) surrounded by a thermoplastic material (e.g. polypropylene).

To increase the impermeability (barrier effect) through the material of the end fitting 8, several techniques are possible, such as e.g. using an end fitting 9 made of a metal material, or using an end fitting 8 comprising a metal inner core as shown in FIG. 8A, or using an end fitting 8 made of any material having a sufficient thickness, or any other way known by the person skilled in the art.

FIG. 4B shows an embodiment of a leak-tight vessel 14 according to an alternative implementation, comprising an end fitting 8 located between the gas and/or liquid tight layer 49 and the fibrous material layer 12. Preferably in this case the material of the end fittings 8, 28 are consolidated with the plastic material of the shell layer and with the material of the barrier strip 60, so that the gas and/or liquid tight layer 49 and the end fitting 8 and the fibrous material 12 are unified to each other.

FIG. 5A shows as a preferred embodiment an example of a barrier strip 60 that can be used in the method of the present invention. Generally, it suffices that the single-layer barrier strip consists of a carefully selected heat-sealable thermoplastic material. In particular polybutene-1 can be selected as the preferred material of choice for the gas and/or liquid-tight barrier layer according to the invention. Polybutene-1 is particularly preferred in case the leak-tight vessel is used for storing potable water. Polybutene-1 is a material approved by the US FDA (Federal and Drug Administration) for such application. Polybutene-1 can be sourced from a.o. Lyondellbasell, Germany. For other applications however, where a higher gas/and or liquid impermeability is required, the multi-layer arrangement as set out in this FIG. 5A is suitable as a preferred three-layer embodiment. The specific layer arrangement and materials chosen depend on the strength and gas and/or liquid permeability requirements desired which in turn will depend on what pressures the vessel is designed for. The vertical dimensions of this figure are largely exaggerated with respect to the horizontal dimensions. It shows a three-layer barrier-strip 60 having a first layer 51 made of a heat-sealable thermoplastic material (such as e.g. polypropylene), an inner layer 52 made of a high barrier material (such as e.g. aluminum), and a second layer 53 also made of polypropylene. The first and second layer can e.g. each be 100 μm thick, while the inner layer can e.g. be 40 μm thick (75), thus the total thickness T of the strip would be 240 μm in this example, but other materials and other dimensions can also be used. The strip can e.g. have a width W of 5 cm, but another width W can also be used, e.g. 2 cm, or 3 cm, or 4 cm; or 6 cm, or 8 cm or 10 cm, or 12 cm or 14 cm or 16 cm or 18 cm or 20 cm, or even higher. It should be noted that the invention would also work if the material of the inner layer 52 would not extend over the complete width W of the strip 60, provided the overlapping distance 66 is measured as the overlap of the inner layers 52 of the substantially parallel strip fragments. Preferably the materials of the first and second outer layer 51, 53 of the barrier strip 60 are the same, but this is not absolutely required, as long as they are compatible materials that can be consolidated (e.g. heat sealed or cured). Instead of polypropylene, another heat-sealable thermoplastic may be chosen, e.g. polybutene-1, for the reasons set forth above.

Figure 5B:
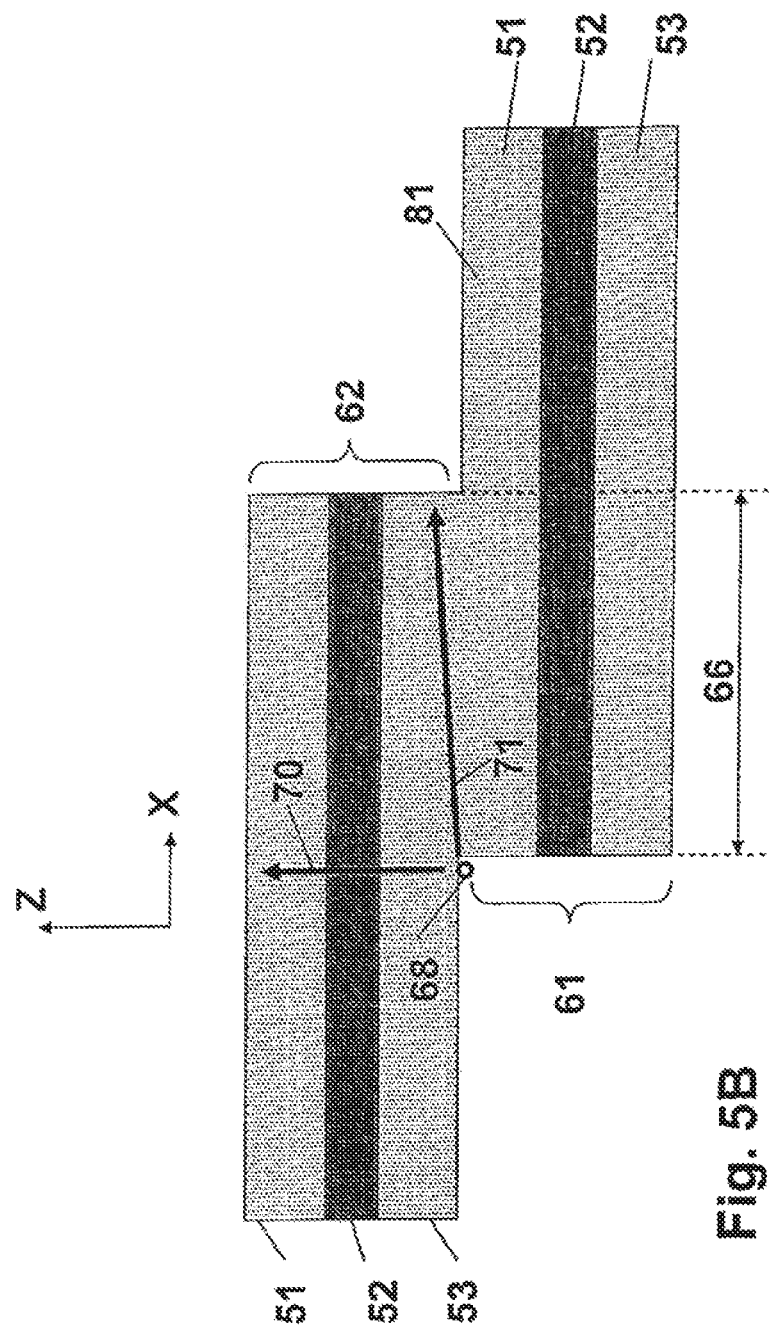
FIG. 5B illustrates the permeability through the inner layer and the permeability over the lateral overlapping distance through the consolidated first and second layers of overlapping barrier strips.

FIG. 5B illustrates the barrier effect of the gas and/or liquid tight layer 49, by considering two substantially parallel overlapping strip fragments. This figure illustrates the permeability through the inner layer 52 and the permeability across the lateral overlapping distance 66 through the consolidated layer 81 after consolidation of the first and second layers 51, 53 of the overlapping strip fragments. According to this preferred embodiment of the invention, the materials and the dimensions of the barrier strip 60 are chosen such that the amount of gas and/or liquid penetrating through the inner layer 52 in the Z-direction as indicated by arrow 70, combined with the amount of gas and/or liquid penetrating through the consolidated layer 81 as indicated by arrow 71 is less than a predetermined permeability, which predetermined permeability depends on the application. When a material such as aluminum is chosen for the inner layer 52, the permeability indicated by arrow 70 through the inner layer 52 is negligible (e.g. <5%) as compared to the permeability in the transversal direction, indicated by arrow 71, thus the permeability is practically only determined by the penetration through the consolidated first and second layer 81 of the barrier strip over the overlapping distance 66. The same barrier effect would be obtained by a solid bottle (liner) having the same material as the consolidated first and/or second layer and a thickness equal to the overlapping distance 66. Even though only two overlapping strips are shown, the same principle applies for the entire gas and/or liquid tight layer 49, as will be described next.

FIG. 6A shows a transversal cross section of the leak-tight vessel of FIG. 4A.

When zooming into FIG. 6A, FIG. 6B shows a detailed cross section of the wall structure of FIG. 6A. It comprising a fibrous material 12 obtained by filament winding, preferably comprising longitudinal fibers such as e.g. glass fibers on the outside of the leak-tight vessel 14, and a gas and/or liquid tight layer 49 on the inside of the vessel 14.

FIG. 6C shows an enlarged view of a section of the gas and/or liquid tight layer 49 shown in FIG. 6B, as obtained by winding a barrier strip 60 around the mandrel 1 according to the method of the present invention. The figure shows a snapshot of some inter-woven substantially parallel and crossing strip fragments 61, 62, 63. The regular stack-up of strip fragments shown is only an example illustrating the overlapping and inter-weaving effect that can occur by the winding of the barrier strip 60. In practice however, the stack-up of strip fragments can be more complicated, but the principle remains the same.

Figure 6D:
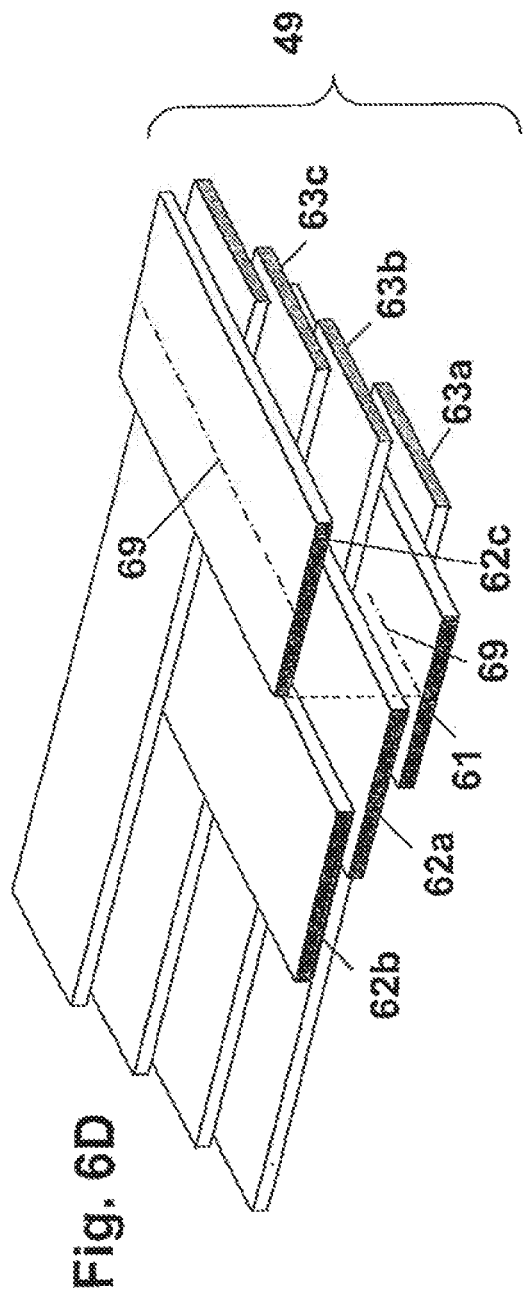
FIG. 6D shows essentially the same picture as FIG. 6C, but rotated and an additional strip fragment is shown.

FIG. 6D shows almost the same picture as FIG. 6C, but rotated and an additional strip fragment 62c is shown to illustrate that strip fragment 61 has two overlapping strip fragments 62a and 62c, one on each side. Assuming an overlap of 50%, the total barrier provided by this interwoven structure is twice the barrier through the consolidated layer 81 over the lateral overlapping distance 66 shown in FIG. 5B, once in each direction, thus over a total distance of W.

Figure 6E:
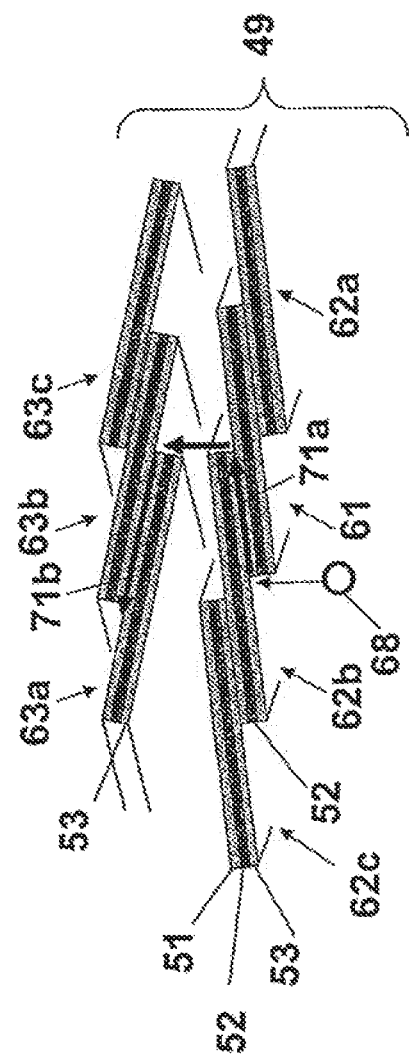
FIG. 6E shows an alternative stack-up of strip fragments, with an indication of the shortest path an amount of gas or liquid can take for escaping from the leak-tight vessel through the gas and/or liquid tight layer.

FIG. 6E shows an alternative arrangement of strip fragments, with an indication of the shortest path an amount of gas or liquid 68 can follow for escaping from the leak-tight vessel 14 through the gas and/or liquid tight layer 49, assuming that the permeability through the inner layer 52 of the barrier strip fragments is negligible as compared to the permeability through the first and second layers 51, 53, as in the example above. An amount of gas and/or liquid 68 present at the left edge of strip fragment 61 (as shown) would penetrate through the consolidated layer of the strip fragments 61 and 62b as indicated by the arrow 71a, not being able to pass in an upwards direction through the inner layer 52b of the strip fragment 62b. When reaching the right edge of strip fragment 62b it can enter the consolidated layer of strip fragment 63a and 63b, not being able to pass through the inner layer of strip fragment 63b.

To obtain such advantageous effect, preferably the first and second layers 51, 53 of the strip fragments (see FIG. 5B) are consolidated to each other, in such a way as to exclude any air bubbles. The inventor has observed that this is reached by exerting an increased pressure upon the barrier strip 60 during the step of filament winding the fibrous material 12 thereto. It should be noted that in this figure schematically two separate sets of strip fragments are shown: a lower set indicated by references 61 and 62, and a higher set indicated by references 63. In reality however the upper set of strip fragments 63 is pressed tightly to the lower set of strip fragments 61, 62, and the second layers 53 of the strip fragments 63 of the upper set are consolidated with contacting first layers 51 of the strip fragments 61, 62 of the lower set.

FIG. 7A shows another (spherical) rounded outer surface area of a mandrel 1 suitable for the method for producing a leak-tight vessel 14 according to the invention. The figure shows again an intermediate stage of the production of a leak-tight vessel, during the winding of a barrier strip 60 around the mandrel 1. This figure was obtained by choosing the minimal lateral overlapping distance 66 to be 50% of the width W of the barrier strip 60. As can be seen, the actual overlapping distance 66 is smallest at the equator 72 where the variable diameter of the mandrel is Dmax, and is largest near the opening 4 where the variable diameter of the mandrel is Dmin.

Figures 7B, 7C:
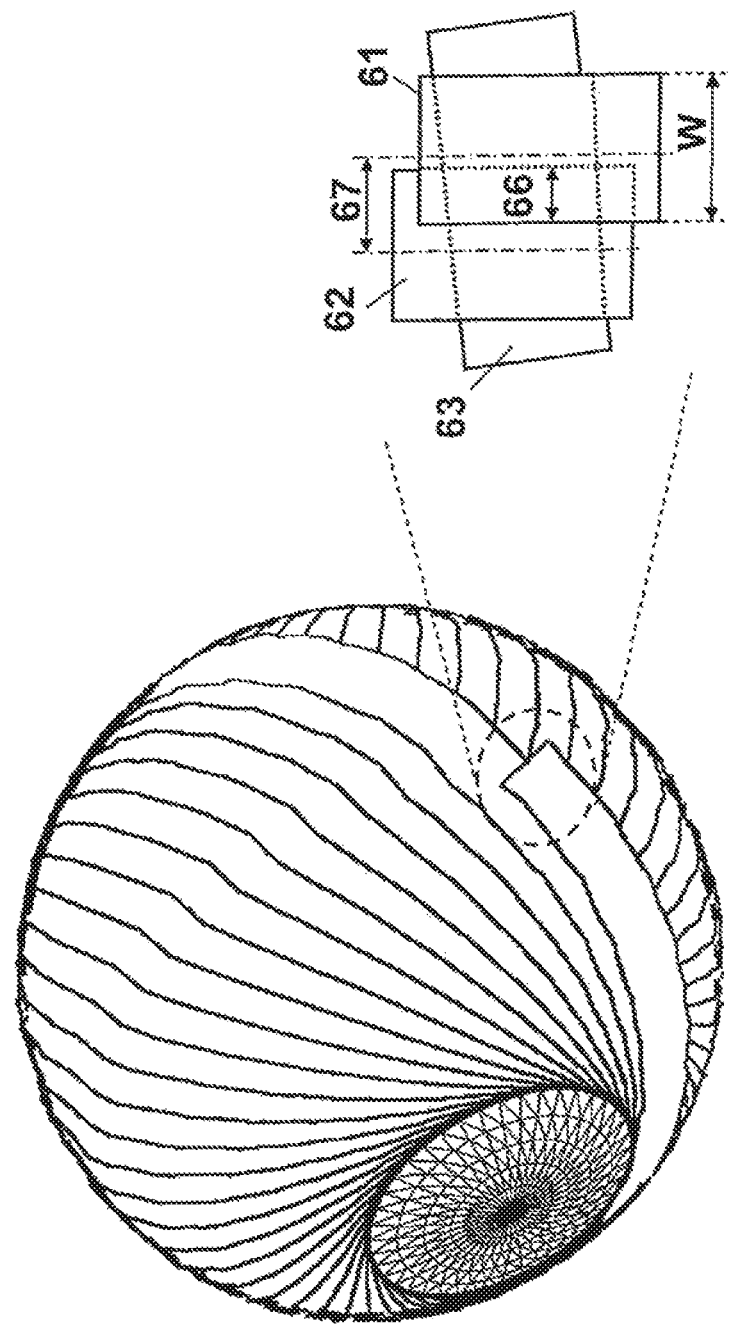
FIG. 7B shows the mandrel of FIG. 7A at a later stage of production, still during the winding of the barrier strip around the mandrel.
FIG. 7C shows in detail two substantially parallel strip fragments and a crossing strip fragment.

FIG. 7B shows the structure of FIG. 7A at a later stage of production, still during the winding of the barrier strip 60 around the mandrel 1. When comparing FIG. 7B with FIG. 3E, the stack-up of the overlapping strip fragments is quite different, but the obtained barrier effect is quite the same, assuming the same barrier strip 60 is used, as well as the same minimum overlapping distance 66.

FIG. 7C shows in detail two substantially parallel strip fragments 61, 62 and a crossing strip fragment 63 for the location indicated by the dashed circle on FIG. 7B. FIG. 7C resembles the stack-up shown in FIG. 6E, while the winding of FIG. 3E resembles the stack-up shown in FIG. 6D, but as explained above, they both have a similar barrier effect.

FIGS. 8A and 8B show an end fitting 8 having a metal inner core partly surrounded by plastic material 88. As shown in FIG. 8A, the metal core can e.g. have a plurality of blind holes 89 with internal screw thread wherein the plastic material is applied so that there is a good mechanical connection between the plastic material and the metal core, together forming the end fitting 8. These holes 89 can be applied on the convex and/or on the concave side of the metal core, or on both sides. Instead of blind holes, also grooves or other mechanical provisions can be used for the same purpose. In FIG. 8B the metal inner core has a bowl shape comprising through holes 90 so that the plastic material 88 on the convex side is connected to the plastic material on the concave side of the metal inner core. In another embodiment (not shown), the metal inner core is completely surrounded by the plastic material. An advantage of an end fitting 8 comprising metal is that it is easy to provide through mounting holes 19 (as shown in FIG. 2F) or holes 19, 89 with internal screw threat, which can be used for the connection of the plastic, but also for the connection of external pipes (not shown) during actual use of the leak-tight vessel 14.

We now will describe and clarify some further preferred embodiments of the leak-tight vessel according to the invention, its constituents parts, and its mode of production.

Preferably the inner layer 52 comprises a material of a predefined thickness 75 such that a permeability 70 through the inner layer 52 is lower than a lateral permeability 71 through the consolidated first and second outer layers 51, 53 across the lateral overlapping distance 66. Although the permeability of the materials of the individual layers of the barrier strip 60 as such is an important feature in the selection of materials for such strip, the overall permeability of the gas and/or liquid tight layer 49 as a whole is essential for the leak-tight vessel 14 manufactured according to the method of our invention.

Preferably the barrier strip 60 is applied in the form of a single continuous strip, preferably a flat strip, so that winding thereof can be achieved in a fast and easy way, with minimal human interference, e.g. on a standard filament winding machine traditionally used for filament winding of continuous fibres. Note that even when the surface is over-wrapped multiple times, the strip can still be continuous.

Preferably the barrier strip 60 has a predefined width W, and the barrier strip 60 is applied in such a way that the lateral overlapping distance 66 measured at the equatorial 72 of the mandrel 1, respectively of the leak-tight vessel so produced, is 10%-90% of the width W of the barrier strip 60, preferably 20%-80%, more preferably 30%-70%, even more preferably 40%-60%, even more preferably 45%-55%, most preferably about 50%. The inventor has found that for a strip of a given width W, the value of 50% overlap is geometrically the optimum value in terms of barrier achieved versus the amount of strip material used (read: cost), but the value of 50% overlap is not required for the invention. For example, for storage of cold water an overlap lower than 50% can be used. In fact, to achieve a particular impermeability (or barrier effect) for the leak-tight vessel 14, a trade-off should be made between the following parameters: 1) the width W of the strip (the broader, the higher the impermeability or barrier effect), 2) the amount of overlapping distance 66 (the more overlap, the higher the impermeability, 3) the number of times the vessel is completely covered, 4) the permeability of the material of the barrier strip 60, 5) the dimensions of the layers of the barrier strip

60. By proper selection, a predefined permeability for the barrier layer, and hence the leak-tight vessel of the invention, can be attained.

Preferably the fibrous material used for the shell layer comprises continuous fibres (pre-) impregnated or co-mingled with a thermoplastic material. Although the material for the formation of the shell layer could take the form of a tape, a fibrous structure is preferred during the filament winding step. According to a preferred embodiment such material comprises a high-strength fibre such as fibre glass or carbon fibres, surrounded by a suitable thermoplastic. Co-mingling is a technique suitable for being applied in the filament winding step of the shell layer according to the present invention. In such case the strong glass or carbon fibres are surrounded by strings of thermoplastic material, such as e.g. polypropylene. An alternative embodiment comprises a thermoplastic binder pre-impregnated into the tape or fibre, or a binder impregnated into the tape or into the glass- or carbon fibre during or shortly before the winding process. This technique bonds the fibres made up of e.g. glass or carbon together so as to form a cohesive, unitary structure. By winding continuous fibres, the obtained endless filament structure will allow the leak-tight vessel 14 to withstand higher hydrostatic pressures. In this way a leak-tight vessel 14 can be produced able to withstand very high pressure e.g. up to 100 bar or even 200 bar or even more.

The material of the continuous fibers can be selected from the group of fibers consisting of: glass fibers, carbon fibers, metal fibers, mineral fibers, wool, cotton, flax, polyester, polypropylene, polyethylene, polyamide, basalt, Kevlar®, aramide, stretched thermoplastics, or a mix of two or more of these fibers, but the invention is not limited thereto, and other fibers can also be used. When using particularly strong fibers such as carbon fibers, a leak-tight vessel 14 can be provided that can possibly withstand a pressure of up to 500 bar.

The method according to the present invention further comprises a step of consolidating the various thermoplastic materials of the barrier strip fragments, of the shell layer and of the first end fitting 8, so as to obtain a unified leak-tight vessel 14. This would result in a leak-tight vessel with excellent mechanical properties. A unified wall structure has better mechanical strength and is less susceptible to damage, impact or wear. Such a vessel can also better resist external forces exerted upon the end fitting 8 and/or 28 for connecting external tubing (not shown).

Preferably the barrier strip 60 has a thickness T in the range of 25 μm-2000 μm, preferably in the range of 50 μm-500 μm, more preferably in the range of 100 μm-500 μm.

An advantageous effect of the selection of a heat sealable thermoplastic material such as e.g. polybutene-1 or polypropylene for the inner barrier layer, is that after consolidation and cooling, such material easily loosens from the metal mandrel. This implies that no pre-treatment of the metal mandrel with release agents such as waxes or silicones is required. This is particularly advantageous for applications of the leak-tight vessels according to our invention for holding potable water.

The inventor has found that a single layer barrier strip consisting of polybutene-1 as well as a multi-layer barrier strip 60 consisting of three layers: polypropylene (100 μm)-aluminum (40 μm)-polypropylene (100 μm) can be wound without problems, however strips with other dimensions can also be used. For an equal amount of iterations of completely covering the outer surface as described above, a larger strip thickness T provides more strength to the gas and/or liquid tight layer 49, but is more expensive.

Preferably the variable outer diameter D has a maximum outer diameter Dmax, and the width W of the barrier strip is 4%-20% of the maximum outer diameter Dmax, preferably 6%-15%, more preferably 8%-12%, most preferably about 10%.

The optimal value for the width W of the strip depends not only on the desired barrier effect, as described above, but also on the shape and size of the mandrel 1, in order to get a gas and/or liquid tight layer 49. The optimal width can be determined by experiments, but for a mandrel 1 with a slowly changing diameter, the 10%-rule is a good rule-of-thumb. In a real-life example a barrier strip 60 was used having a width W of 50 mm, to wind a vessel with a shape as shown in FIG. 4A, having a maximum diameter of 450 mm (and a minimum diameter of 220 mm), which is 9% of 450 mm.

In an embodiment the filament winding of the fibrous material is applied in such a way, and the materials of the barrier strip 60 and of the end fitting 8 and of the fibrous material are selected so as to obtain a pressure vessel 14 able to withstand internal pressure up to 10 bar, preferably up to 25 bar, more preferably up to 50 bar, even more preferably up to 100 bar, or even 200 bar. Although the method according to the invention is ideally suited for making leak-tight pressure vessels 14, the invention is not limited thereto. In fact, the method disclosed is also very well suited for making leak-tight vessels 14 for low pressure applications (e.g. <5 bar), such as water tanks or fuel tanks. The main advantages of the leak-tight vessel according to the present invention are: its high strength, low weight, recyclability, and good or excellent barrier.

Preferably the leak-tight vessel 14 has an internal volume in the range of 5-1000 liter, preferably in the range of 10-500 liter, more preferably in the range of 20-250 liter, but the invention is not limited thereto. The invention is also very well suited for producing leak-tight vessels with an internal volume smaller than 5 liter, or larger than 1000 liter.

Several materials can be chosen for the barrier strip 60. In case of a multi-layer structure, it is important that the material of the first and second layers 51, 53 show good cohesion with the inner layer 52, and that contacting first and second layers 51, 53 of overlapping strips 61, 62, 63 can be consolidated to each other, but this still leaves many options for the choice of the materials, as shown in table 1, listing some examples. The invention is however not limited hereto, but only by the claims.

TABLE-US-00001 TABLE 1 inner layer 52 first and second layers 51, 53 Aluminum heat-sealable thermoplastic, e.g. polypropylene (PE) Aluminum polybutene-1 Ethylene Vinyl Alcohol (EVOH) Polypropylene (PP) or polybutene-1 (PB-1) High Temperature thermoplastic, Low temperature thermoplastic, e.g. e.g. HD-polypropylene (130. degree. C.) LD-polypropylene (105.degree. C.) High Temperature resistive Low temperature thermoplastic, resin, e.g. e.g. LD-polypropylene (105.degree. C.) Polysulfone (PSU), Polyethersulfone (PES), Polyphenysulfone (PPSU)

In one embodiment the first and second outer layers 51, 53 comprise a heat-sealable material, in which case the consolidation is done by heat-sealing at a predefined temperature, depending on the chosen materials.

In an embodiment the heat-sealable material is a thermoplastic material selected from the group consisting of: polypropylene (PP) and Polybutene-1 (PB-1- and polyethylene (PE). Polypropylene can e.g. be used for low temperature applications up to about 55.degree. C. Polybutene-1 is more expensive, but can be used in applications up to about 90.degree. C. Other heat-sealable thermoplastic materials are however also possible.

In an embodiment the inner layer 52 of the barrier strip 60 comprises a metal. Some metal materials have excellent barrier properties for certain gasses or liquids.

In a preferred embodiment the inner layer 52 of the barrier strip 60 comprises aluminum. Aluminium is very well suited as a barrier against cold water, hot water or gasses such as oxygen or air. When using aluminium, the permeability of the inner layer 52 is extremely small as compared to the permeability of the first and second layers 51, 53, meaning that the leakage through the gas and/or liquid tight layer 49 is practically fully determined by the material and dimensions of the first and second outer layers 51, 53 of the barrier strip 60, and by the minimum overlapping distance 66, typically encountered near the equatorial 72 of the vessel.

In another embodiment the inner layer 52 of the barrier strip 60 comprises a third material selected from the group consisting of: polyurethane (PUR), acrylonitrile (AN), polyacrylonitrile (PAN), polyamide (PA), polyethyleentereftalate (PET). These materials are all high barrier materials for specific gasses or liquids or vapours. Depending on the substance to be stored in the vessel, and the physical conditions of the storage (temperature, pressure) one of these materials can be used. For example, Polyurethane is very well suited for hot water applications. But other high barrier materials known to the person skilled in the art can also be used as the inner layer 52 of the barrier strip 60.

In another embodiment the first resp. second plastic material is a first resp. second thermoplastic material with a first resp. second melting temperature, and the third material is a third thermoplastic material having a melting temperature higher than the first melting temperature and higher than the second melting temperature. Preferably the third thermoplastic material of the inner layer 52 of the barrier strip 60, comprises a third material selected from the group consisting of High-Temperature-Polypropylene, Polyethylene (PE), Ethylene Vinyl Alcohol (EVOH). When such a barrier strip 60 is used, the consolidation is done at a temperature at which the first and second layers 51, 53 weaken or melt, while the inner layer 52 does not and remains intact. High-Temperature polypropylene as well as polybutene-1 is very well suited for cold water applications. EVOH provides an excellent barrier to gasses such as oxygen or air, but is relatively expensive. Thermoplastic barrier materials are generally cheaper than aluminium and easier to recycle.

EXAMPLES

As a first example of a method for producing a leak-tight vessel 14 according to the invention, a mandrel as shown in FIG. 2A is assembled, and two end fittings 8, 28 are placed on the spindle parts 42, 43, whereby the first end fitting 8 comprises polypropylene (=thermoplastic) reinforced with 40 weight % glass fibers, then a three-layer barrier strip 60 having a first and a second layer 51, 53 consisting of polypropylene and an inner layer 52 consisting of aluminum is wound around the mandrel 1 as explained above. Such a strip is e.g. available from the company Amcor Flexibles. Then the mandrel 1 is filament wound using continuous glass fibers pre-impregnated with polypropylene as plastic material (e.g. 60 weight % glass fibers, 40 weight % polypropylene, available as Twintex from the company Vetrotex), then the matrix material of the first end fitting (polypropylene) and the plastic material (polypropylene) of the outer layers 51, 53 of the barrier strip 60 and the plastic material (polypropylene) of the fiber impregnation are consolidated at a temperature of approximately 160.degree. C. for approximately 30 minutes, then after cooling down to room temperature, the mandrel 1 is disassembled by removing the elongated segments 6, the segment holders 7, and the first and second spindle parts 42, 43, while leaving the first and second end fittings 8, 28 behind in the vessel 14, and the leak-tight vessel 14 is ready for use, and the mandrel is ready for reuse. In this case a leak-tight vessel as shown in FIG. 4A is obtained.

A second example is very similar to the first example, except that the end fitting 8 comprises an aluminum core coated with polybutene-1 (thermoplastic), and that for the barrier strip a single layer consisting of polybutene-1 is chosen. The polybutene-1 of the end fitting will be consolidated in further steps with the polybutene-1 selected as thermoplastic material for the single-layer barrier strips. Still in a further consolidation step, the above materials will be further consolidated with the thermoplastic material (polypropylene) surrounding the continuous fibers used in the shell layer winding formation step.

It is clear to the person skilled in the art that many more combinations and alterations are possible, and that the materials and process can be optimized for specific applications.

SUMMARY

By the above description and figures it can be understood that a leak-tight vessel 14 with a fibrous wall 12 can be produced by winding a barrier strip 60 around a mandrel 1, thereby avoiding either the need for a heavy and expensive inner bottle ("liner") or the need for a one-time use and hence expensive mandrel. By using compatible thermoplastic materials as described above, a leak-tight vessel 14 with a very thin (e.g. <1 cm) yet very strong structure (e.g. up to 25 bar) can be obtained, thereby saving material, cost and weight. On top hereof, the resulting vessel is perfectly recyclable. By choosing proper materials for the barrier strip 60, the effective barrier of the gas and/or liquid tight layer 49 caused by winding the barrier strip 60 can be as high than the barrier of the traditional plastic bottle (or "liner").

The invention can be used to produce a wide variety of vessels for different applications, such as e.g. containers for storing potable water, milk, soft drinks, beer, wine, or other liquids, hot water boilers, fuel tanks, gas tanks, hydrogen tanks, oxygen tanks, chemical tanks, etc. Dimensions can range from about 20 cm in height H and/or diameter Dmax for portable containers such as e.g. oxygen bottles, up to several meters, e.g. 2 m in height and/or diameter for large leak-tight vessels such as e.g. storage tanks, and all sizes in between. The height can e.g. be 20 cm, 35 cm, 50 cm, 75 cm, 1 m, 1.25 m, 1.50 m, 1.75 m, 2.0 m or higher. The maximum diameter Dmax can e.g. be 20 cm, 35 cm, 50 cm, 75 cm, 1 m, 1.25 m, 1.50 m, 1.75 m, 2.0 m or higher. The height H can be the same as the diameter Dmax, or the height H can be larger than the diameter, or vice versa.

The described method for producing a leak-tight vessel 14 basically only requires a filament winding machine. A lot of factory space can be saved with respect to traditional approaches where additional processing steps and machinery are required. This is advantageous for the price of the leak-tight vessel 14 and for the environment. Another advantage of this method is that it causes essentially no material waste during the production. An additional advantage resulting from the use of thermoplastic materials is that a 100% recyclable leak-tight vessel can be produced. When carbon fibers are used, leak-tight vessels 14 for extremely high pressure (e.g. >200 bar) can be produced. The leak-tight vessel 14 can be produced in a fast and easy and highly economical way that can be highly automated.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A leak-tight vessel for holding a gas and/or a liquid, comprising:
    an inner barrier layer comprising a heat-sealable thermoplastic material, wherein the inner barrier layer is formed by winding a barrier strip;
    an outer shell layer comprising a fiber-reinforced heat-sealable thermoplastic material, wherein the outer shell layer is formed by winding glass- or carbon-fibers, co-mingled, impregnated or pre-impregnated with a heat-sealable thermoplastic material; and
    an end fitting positioned at the inner side of the inner barrier layer, covered at least partly at its outer concave surface with a heat-sealable thermoplastic material;
    wherein the inner barrier layer, the outer shell layer and the end fitting form a unitary rigid structure able to withstand an overpressure of at least two bars.

2. The leak-tight vessel according to claim 1, wherein the inner barrier layer comprises consolidated at least partially overlapping strip fragments comprising said heat-sealable thermoplastic material.

3. The leak-tight vessel according to claim 2 wherein the lateral overlapping distance measured at the equatorial of the leak-tight vessel is 10-90% of the width of the barrier strip.

4. The leak-tight vessel according to claim 2, wherein the width W of the barrier strip fragments is 4%-20% of the maximum outer diameter of the leak-tight vessel.

5. The leak-tight vessel according to claim 2, wherein the at least partially overlapping strip fragments are applied by winding a continuous strip of a heat-sealable thermoplastic material around the outer rounded surface of a reusable and removable mandrel.

6. The leak-tight vessel according to claim 1, wherein the thickness of the barrier layer is situated between 100 and 500 μm.

7. The leak-tight vessel according to claim 1 wherein the heat-sealable thermoplastic material of the inner barrier layer consists of either a single layer or a multi-layer arrangement.

8. The leak-tight vessel according to claim 7 wherein a multi-layer arrangement is a three-layer arrangement.

9. The leak-tight vessel according to claim 7 wherein the heat-sealable thermoplastic material of the inner barrier layer includes polybutene-1.

10. The leak-tight vessel according to claim 8 wherein the three-layer arrangement includes a metal.

11. The leak-tight vessel according to claim 1 wherein the heat-sealable thermoplastic material is polypropylene.

12. The leak-tight vessel according to claim 1 wherein the end fitting comprises an opening neither covered by the inner barrier layer nor by the outer shell layer, which opening is large enough to enable the disassembly and removal of a re-usable and re-movable mandrel used during the manufacture of the leak-tight vessel.

13. The leak-tight vessel according to claim 12, wherein the end fitting comprises means such as a flange, positioned outside the vessel for connecting said vessel to external piping.

14. The leak-tight vessel according to claim 12, wherein neither the end fitting nor the connection means comprise mechanical fastening means such as bolts and nuts, for securely integrating the end fitting into the rigid unitary structure comprising the inner barrier layer, the outer shell layer and the end fitting.

15. The leak-tight vessel according to any of the preceding claims wherein an outer peripheral of the end fitting is dimensioned such that by covering the outer concave side of the end fitting outside the opening up to said outer peripheral by the inner barrier layer and the outer shell layer, the resulting rigid unitary structure formed by the inner barrier layer, the outer shell layer and the end fitting can withstand an overpressure of at least two bars.

\* \* \* \* \*